United States Patent
Awatani et al.

(10) Patent No.: US 12,309,518 B2
(45) Date of Patent: May 20, 2025

(54) SOLID-STATE IMAGING ELEMENT

(71) Applicant: SONY SEMICONDUCTOR SOLUTIONS CORPORATION, Kanagawa (JP)

(72) Inventors: Yoshio Awatani, Kanagawa (JP); Pawankumar Pradeepkumar Moyade, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 176 days.

(21) Appl. No.: 18/040,947

(22) PCT Filed: Jun. 29, 2021

(86) PCT No.: PCT/JP2021/024459
§ 371 (c)(1),
(2) Date: Feb. 7, 2023

(87) PCT Pub. No.: WO2022/038903
PCT Pub. Date: Feb. 24, 2022

(65) Prior Publication Data
US 2023/0345144 A1  Oct. 26, 2023

(30) Foreign Application Priority Data
Aug. 20, 2020 (JP) .................. 2020-139317

(51) Int. Cl.
*H04N 25/616* (2023.01)
*H04N 25/671* (2023.01)
(Continued)

(52) U.S. Cl.
CPC ........... *H04N 25/78* (2023.01); *H04N 25/616* (2023.01); *H04N 25/703* (2023.01);
(Continued)

(58) Field of Classification Search
CPC .... H04N 25/00; H04N 25/616; H04N 25/671; H04N 25/703; H04N 25/709; H04N 25/75; H04N 25/77; H04N 25/772; H04N 25/78
See application file for complete search history.

(56) References Cited

U.S. PATENT DOCUMENTS

2016/0295142 A1 * 10/2016 Yoshida ................. H04N 25/78
2018/0103222 A1   4/2018 Yan
(Continued)

FOREIGN PATENT DOCUMENTS

JP   2018-148541 A   9/2018
WO  2019/026564 A1   2/2019

OTHER PUBLICATIONS

International Search Report and Written Opinion of PCT Application No. PCT/JP2021/024459, issued on Sep. 7, 2021, 08 pages of ISRWO.

*Primary Examiner* — Lin Ye
*Assistant Examiner* — Chriss S Yoder, III
(74) *Attorney, Agent, or Firm* — CHIP LAW GROUP

(57) ABSTRACT

Provided is a solid-state imaging element provided with a comparator for each column, the solid-state imaging element improving the image quality of image data. The solid-state imaging element includes a first comparison element and a transistor. An input voltage related to the voltage of a vertical signal line is input to a source of the first comparison element, and the first comparison element outputs a drain voltage corresponding to the gate-source voltage from a drain. A signal corresponding to the voltage of the vertical signal line is input to a gate of the transistor, and a source of the transistor is connected to the drain of the first comparison element.

24 Claims, 42 Drawing Sheets

(51) Int. Cl.
*H04N 25/703* (2023.01)
*H04N 25/709* (2023.01)
*H04N 25/75* (2023.01)
*H04N 25/77* (2023.01)
*H04N 25/772* (2023.01)
*H04N 25/78* (2023.01)

(52) U.S. Cl.
CPC ........... *H04N 25/709* (2023.01); *H04N 25/75* (2023.01); *H04N 25/77* (2023.01); *H04N 25/772* (2023.01); *H04N 25/671* (2023.01)

(56) References Cited

U.S. PATENT DOCUMENTS

2022/0166949 A1* 5/2022 Moue ..................... H04N 25/57
2023/0353907 A1* 11/2023 Moue ..................... H04N 25/79

\* cited by examiner

SOLID-STATE IMAGING ELEMENT

CROSS REFERENCE TO RELATED APPLICATIONS

This application is a U.S. National Phase of International Patent Application No. PCT/JP2021/024459 filed on Jun. 29, 2021, which claims priority benefit of Japanese Patent Application No. JP 2020-139317 filed in the Japan Patent Office on Aug. 20, 2020. Each of the above-referenced applications is hereby incorporated herein by reference in its entirety.

TECHNICAL FIELD

The present technology relates to a solid-state imaging element. Specifically, the present technology relates to a solid-state imaging element that performs analog-digital conversion for each column.

BACKGROUND ART

Conventionally, a single-slope analog to digital converter (ADC) is used for analog to digital (AD) conversion in a solid-state imaging element or the like because of its simple structure. The single-slope ADC generally includes a comparator and a counter that performs counting on the basis of a comparison result of the comparator. For example, a solid-state imaging element has been proposed in which a p-channel metal-oxide-semiconductor (pMOS) transistor having a pixel signal input to a source and a reference signal input to a gate is disposed in a comparator (see, for example, Patent Document 1). The drain and the source of the pMOS transistor are short-circuited by an auto-zero switch.

CITATION LIST

Patent Document

Patent Document 1: US 2018/0103222 A

SUMMARY OF THE INVENTION

Problems to be Solved by the Invention

In the above-described solid-state imaging element, a power source of a pixel circuit is shared by the comparator so as to reduce power consumption as compared with a configuration in which a power source is also provided in a comparator separately from a pixel circuit. However, in the above-described solid-state imaging element, image quality of captured image data may be deteriorated. Conceivable examples of factors in deterioration in image quality include reset feedthrough during operation of the auto-zero switch and an insufficient dynamic range.

The present technology has been made in view of such a circumstance, and an object thereof is to improve image quality of image data in a solid-state imaging element provided with a comparator for each column.

Solutions to Problems

The present technology is accomplished to address the above problem, and a first aspect of the present technology provides a solid-state imaging element including: a first comparison element that has a source to which an input voltage related to a voltage of a vertical signal line is input, the first comparison element outputting a drain voltage corresponding to a gate-source voltage from a drain; and a transistor that has a gate to which a signal corresponding to the voltage of the vertical signal line is input, and a source connected to the drain of the first comparison element. This configuration provides an effect of improving image quality.

In addition, in the first aspect, the source of the first comparison element may be connected to the vertical signal line, the first comparison element may have a gate to which a predetermined reference voltage is input, the first comparison element may transition from an off state to an on state in a case where the input voltage and the reference voltage substantially coincide with each other, and the transistor may include a first clamp transistor that fixes the drain voltage in the off state to a clamp voltage corresponding to the input voltage. This configuration provides an effect of ensuring linearity.

In addition, in the first aspect, the solid-state imaging element may further include a clamp voltage controller that supplies the signal to a gate of the first clamp transistor, and the first clamp transistor may be inserted between the drain and the source of the first comparison element. This configuration provides an effect of supplying a gate voltage corresponding to the voltage of the vertical signal line.

In addition, in the first aspect, the solid-state imaging element may further include a second clamp transistor connected in parallel to the first clamp transistor, and the second clamp transistor may have a gate to which a fixed voltage is applied.

In addition, in the first aspect, the clamp voltage controller may include a capacitor inserted between the vertical signal line and the gate of the clamp transistor.

In addition, in the first aspect, the clamp voltage controller may divide a voltage between the voltage of the vertical signal line and a predetermined reference potential and supply the divided voltage to the gate of the first clamp transistor. Examples of methods for dividing a voltage include a method for dividing a potential between the vertical signal line and a predetermined reference potential by a capacitor or a resistor. This configuration provides an effect of widening a dynamic range.

In addition, in the first aspect, the solid-state imaging element may further include an initialization circuit that samples a voltage of the vertical signal line, holds the sampled voltage as a held voltage, and initializes a gate voltage of the first clamp transistor on the basis of the held voltage. The gate of the first clamp transistor becomes a high impedance node when the capacitor is provided. This configuration provides an effect of initializing the clamp voltage to a value corresponding to the voltage of the vertical signal line.

In addition, in the first aspect, the initialization circuit may sample and hold a pixel signal of a pixel circuit.

In addition, in the first aspect, the initial circuit may sample and hold a pixel signal of a light-shielded pixel that is shielded from light.

In addition, in the first aspect, the initial circuit may sample and hold a pixel signal of a dummy pixel.

In addition, in the first aspect, the driver may sample and hold a pixel signal of a dummy pixel that is shielded from light.

In addition, in the first aspect, the solid-state imaging element may include a counter that counts a count value during a period until the drain voltage is inverted. This configuration provides an effect of converting the analog signal into a digital signal. As the counter described here, a dedicated counter may be provided, or an AD output result may be used.

In addition, in the first aspect, the solid-state imaging element may include: a correction coefficient calculation unit that calculates a correction coefficient for correcting a conversion gain that is a ratio between the input voltage and the count value; and a correction unit that corrects a digital signal indicating the count value on the basis of the correction coefficient. This configuration provides an effect of improving sensitivity.

In addition, in the first aspect, the solid-state imaging element may further include a controller that calculates a correction coefficient for correcting a conversion gain that is a ratio between the input voltage and the count value, and controls the reference voltage on the basis of the correction coefficient. This configuration provides an effect of improving sensitivity.

In addition, in the first aspect, the transistor may include an auto-zero switch that short-circuits a gate and the drain of the first comparison element in accordance with the signal. This configuration provides an effect of reducing noise.

In addition, in the first aspect, the source of the first comparison element may be connected to the vertical signal line, and a predetermined reference voltage may be input to the gate of the first comparison element. This configuration provides an effect of reducing noise in the comparator.

In addition, in the first aspect, the solid-state imaging element may further include a driver that generates a predetermined control signal as the signal on the basis of the voltage of the vertical signal line. This configuration provides an effect of driving the auto-zero switch.

In addition, in the first aspect, the driver may supply one of two values as the control signal. This configuration provides an effect of achieving binary driving of the auto-zero switch.

In addition, in the first aspect, the driver may sample and hold a pixel signal of a pixel circuit, and generate the control signal on the basis of the held pixel signal. This configuration provides an effect of suppressing reset feedthrough.

In addition, in the first aspect, the driver may sample and hold a pixel signal of a light-shielded pixel shielded from light, and generate the control signal on the basis of the held pixel signal. This configuration provides an effect of suppressing reset feedthrough.

In addition, in the first aspect, the driver may generate the control signal on the basis of a pixel signal of a dummy pixel. This configuration provides an effect of suppressing reset feedthrough.

In addition, in the first aspect, the driver may generate the control signal on the basis of a pixel signal of a dummy pixel that is shielded from light. This configuration provides an effect of suppressing reset feedthrough.

In addition, in the first aspect, the first comparison element may be disposed in a column amplifier that amplifies the voltage of the vertical signal line and supplies the amplified voltage to an analog-to-digital converter. This configuration provides an effect of suppressing reset feedthrough in the column amplifier.

In addition, in the first aspect, the solid-state imaging element may further include a second comparison element that has a gate to which the voltage of the vertical signal line is input, a drain connected to a power supply voltage, and a source connected to the source of the first comparison element. This configuration provides an effect of reducing a voltage of the reference signal.

MODE FOR CARRYING OUT THE INVENTION

Modes (hereinafter referred to as embodiments) for carrying out the present technology will be described below. The description will be given in the following order.
1. First embodiment (example of supplying gate voltage corresponding to voltage of vertical signal line to clamp transistor)
2. Second embodiment (example of supplying control signal corresponding to voltage of vertical signal line to auto-zero switch)
3. Example of application to mobile object 1. First Embodiment

Figure 1:
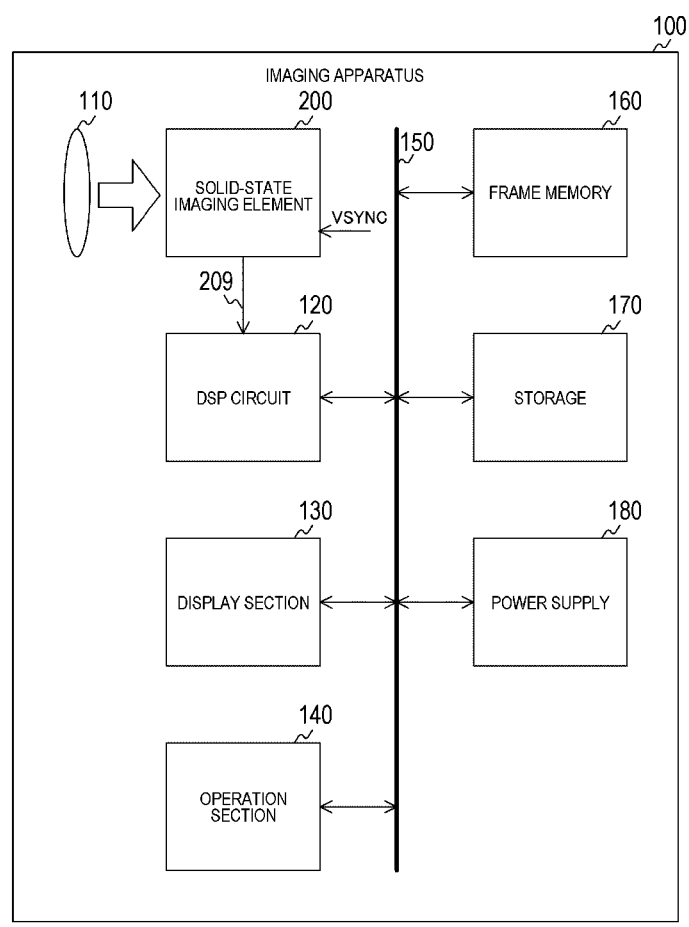
FIG. 1 is a block diagram illustrating a configuration example of an imaging apparatus according to a first embodiment of the present technology.

[Configuration Example of Imaging Apparatus]
FIG. 1 is a block diagram illustrating a configuration example of an imaging apparatus 100 according to a first embodiment of the present technology. The imaging apparatus 100 is a device for imaging image data, and includes an optical unit 110, a solid-state imaging element 200, and a digital signal processing (DSP) circuit 120. The imaging apparatus 100 further includes a display section 130, an operation section 140, a bus 150, a frame memory 160, a storage 170, and a power supply 180. As the imaging apparatus 100, a camera mounted on a smartphone, an in-vehicle camera, or the like is assumed.

The optical unit 110 condenses light from a subject and guides the light to the solid-state imaging element 200. The solid-state imaging element 200 generates image data by photoelectric conversion. The solid-state imaging element 200 supplies the generated image data to the DSP circuit 120 via a signal line 209.

The DSP circuit 120 executes predetermined signal processing on the image data. The DSP circuit 120 outputs the processed image data to the frame memory 160 or the like via the bus 150.

The display section 130 displays image data. As the display section 130, a liquid crystal panel or an organic electro luminescence (EL) panel is assumed, for example. The operation section 140 generates an operation signal according to a user's operation.

The bus 150 is a common path for the optical unit 110, the solid-state imaging element 200, the DSP circuit 120, the display section 130, the operation section 140, the frame memory 160, the storage 170, and the power supply 180 to exchange data with each other.

The frame memory 160 holds image data. The storage 170 stores various kinds of data such as image data. The power supply 180 supplies power to the solid-state imaging element 200, the DSP circuit 120, the display section 130, and the like.

Figure 2:
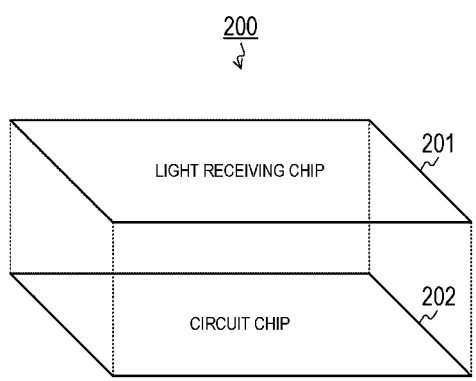
FIG. 2 is a diagram illustrating an example of a stacked structure of a solid-state imaging element according to the first embodiment of the present technology.

FIG. 2 is a diagram illustrating an example of a stacked structure of the solid-state imaging element 200 according to the first embodiment of the present technology. The solid-state imaging element 200 includes a circuit chip 202 and a light receiving chip 201 stacked on the circuit chip 202. These chips are electrically connected via a connection portion such as a via. Note that they can be connected using Cu—Cu bonding or a bump instead of via.

[Configuration Example of Solid-State Imaging Element]

Figure 3:
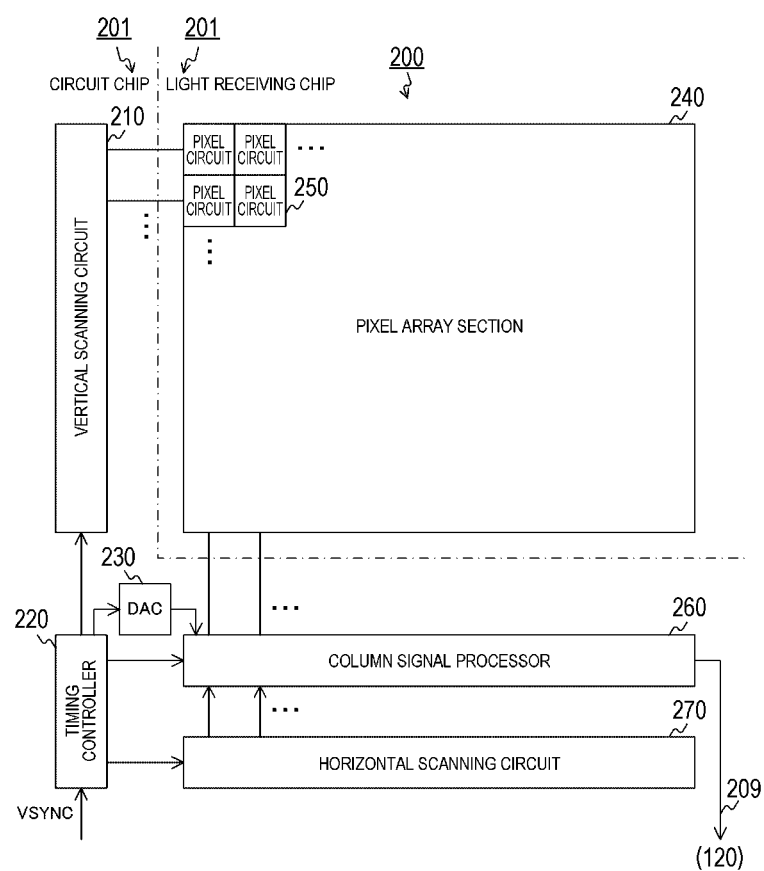
FIG. 3 is a block diagram illustrating a configuration example of the solid-state imaging element according to the first embodiment of the present technology.

FIG. 3 is a block diagram illustrating a configuration example of the solid-state imaging element 200 according to the first embodiment of the present technology. The solid-state imaging element 200 includes a vertical scanning circuit 210, a timing controller 220, a digital to analog converter (DAC) 230, a pixel array section 240, a column signal processor 260, and a horizontal scanning circuit 270. A plurality of pixel circuits 250 is arranged in a two-dimensional lattice pattern in the pixel array section 240.

The pixel array section 240 is arranged on the light receiving chip 201, for example, and the remaining circuits are arranged on the circuit chip 202. Note that the circuits arranged in the respective chips are not limited to those illustrated in the drawing.

The vertical scanning circuit 210 sequentially selects and drives rows in the pixel array section 240.

The timing controller 220 controls operation timings of the vertical scanning circuit 210, the DAC 230, the column signal processor 260, and the horizontal scanning circuit 270 in synchronization with a vertical synchronization signal VSYNC.

The DAC 230 generates a sawtooth ramp signal and supplies the generated ramp signal to the column signal processor 260 as a reference signal.

The pixel circuit 250 generates an analog pixel signal by photoelectric conversion under the control of the vertical scanning circuit 210. The pixel circuits 250 of each column output pixel signals to the column signal processor 260 via a vertical signal line (not illustrated).

In the column signal processor 260, an ADC (not illustrated) is disposed for each column of the pixel circuits 250. Each of the ADCs converts the pixel signals of the corresponding column into digital signals and outputs the digital signals to the DSP circuit 120 under the control of the horizontal scanning circuit 270.

The horizontal scanning circuit 270 controls the column signal processor 260 to sequentially output digital signals.

[Configuration Example of Pixel Circuit]

Figure 4:
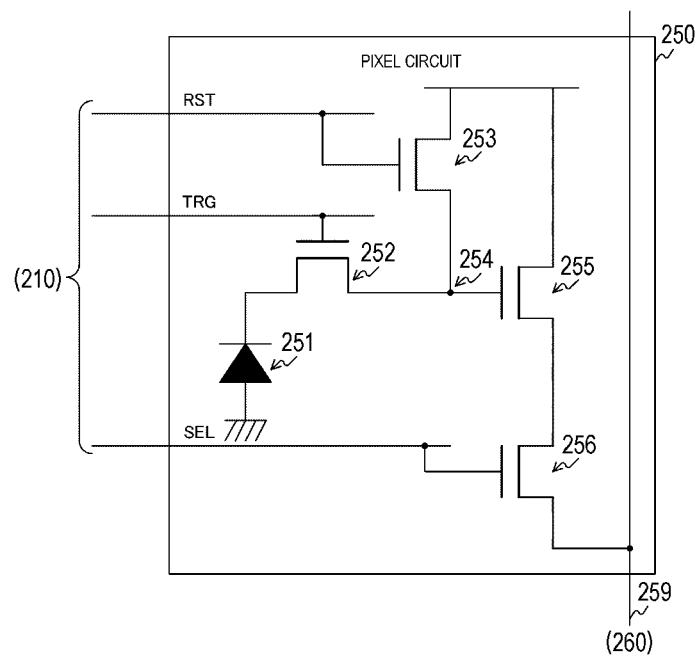
FIG. 4 is a circuit diagram illustrating a configuration example of a pixel circuit in the first embodiment of the present technology.

FIG. 4 is a circuit diagram illustrating a configuration example of the pixel circuit 250 in the first embodiment of the present technology. The pixel circuit 250 includes a photoelectric conversion element 251, a transfer transistor 252, a reset transistor 253, a floating diffusion layer 254, an amplification transistor 255, and a selection transistor 256. In addition, in the pixel array section 240, vertical signal lines 259 are wired for each column along the vertical direction.

The photoelectric conversion element 251 photoelectrically converts incident light to generate charges. The transfer transistor 252 transfers charges from the photoelectric conversion element 251 to the floating diffusion layer 254 in accordance with a transfer signal TRG from the vertical scanning circuit 210.

The reset transistor 253 extracts and initializes charges from the floating diffusion layer 254 in accordance with a reset signal RST from the vertical scanning circuit 210.

The floating diffusion layer 254 accumulates charges and generates a voltage corresponding to the charge amount. The amplification transistor 255 amplifies the voltage of the floating diffusion layer 254.

The selection transistor 256 outputs the amplified voltage signal as a pixel signal to the column signal processor 260 via the vertical signal line 259 in accordance with a selection signal SEL from the vertical scanning circuit 210.

[Configuration Example of Column Signal Processor]

Figure 5:
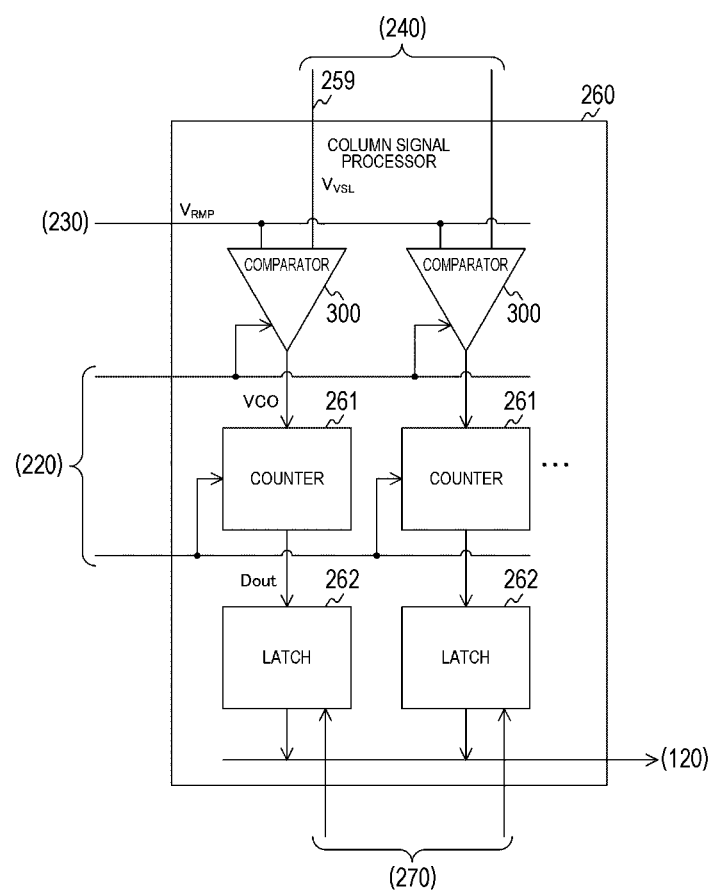
FIG. 5 is a block diagram illustrating a configuration example of a column signal processor in the first embodiment of the present technology.

FIG. 5 is a block diagram illustrating a configuration example of the column signal processor 260 in the first embodiment of the present technology. The column signal processor 260 includes a comparator 300, a counter 261, and a latch 262 which are disposed for each column. In a case where the number of columns is N (N is an integer), N comparators 300, N counters 261, and N latches 262 are disposed.

The comparator 300 compares the reference signal from the DAC 230 with the pixel signal from the corresponding column. The voltage of the reference signal is hereinafter referred to as a reference voltage VRMP, and the voltage of the vertical signal line 259 that transmits the pixel signal is hereinafter referred to as an input voltage VVSL. The comparator 300 supplies an output signal VCO indicating a comparison result to the counter 261 of the corresponding column.

In addition, the level (that is, the input voltage VVSL) of the pixel signal when the pixel circuit 250 is initialized is hereinafter referred to as a "reset level", and the level of the pixel signal when charges are transferred to the floating diffusion layer 254 is hereinafter referred to as a "signal level".

The counter 261 counts a count value during a period until the output signal VCO is inverted. The counter 261 down-counts during a period until the output signal VCO corresponding to the reset level is inverted, and up-counts during a period until the output signal VCO corresponding to the signal level is inverted, for example. As a result, correlated double sampling (CDS) processing of obtaining a difference between the reset level and the signal level is achieved.

Then, the counter 261 makes the latch 262 hold a digital signal indicating the count value. AD conversion processing of converting an analog pixel signal into a digital signal is achieved by the comparator 300 and the counter 261. That is, the comparator 300 and the counter 261 function as an ADC. The ADC using the comparator and the counter as described above is generally called a single-slope ADC.

Note that, although the CDS processing is implemented by up-counting and down-counting, the configuration is not limited thereto. The counter 261 may only perform either the up-counting or the down-counting, and the CDS processing for obtaining the difference may be executed by a circuit at the subsequent stage.

The latch 262 holds a digital signal. The latch 262 outputs the held digital signal under the control of the horizontal scanning circuit 270.

[Configuration Example of Comparator]

Figure 6:
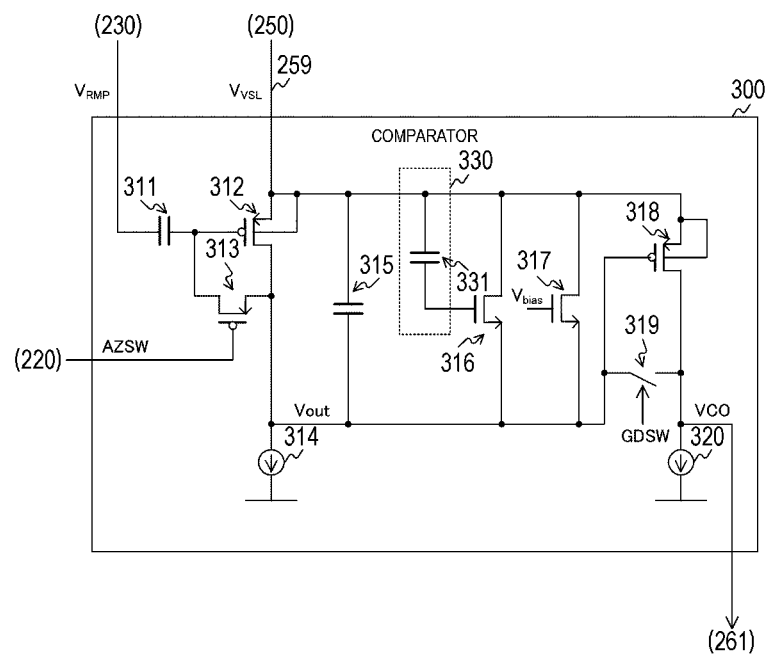
FIG. 6 is a circuit diagram illustrating a configuration example of a comparator in the first embodiment of the present technology.

FIG. 6 is a circuit diagram illustrating a configuration example of the comparator 300 in the first embodiment of the present technology. The comparator 300 includes an input capacitor 311, an input transistor 312, an auto-zero switch 313, a current source 314, and a band-limiting capacitor 315. In addition, the comparator 300 further includes a clamp voltage controller 330, clamp transistors 316 and 317, an output transistor 318, an initialization switch 319, and a current source 320.

The input capacitor 311 is inserted between the DAC 230 and a gate of the input transistor 312.

A source of the input transistor 312 is connected to the vertical signal line 259, and the input voltage VVSL which is a voltage of the vertical signal line 259 is input to the source. Furthermore, the reference voltage VRMP is input to the gate of the input transistor 312 via the input capacitor 311. When the input voltage VVSL input to the source and the reference voltage VRMP input to the gate substantially coincide with each other, the input transistor 312 outputs a drain voltage corresponding to the input voltage VVSL from the drain as a comparison result Vout. Here, the wording "substantially coincide" means that the compared voltages completely coincide with each other or the difference between them is within a predetermined allowable value. The allowable value is set as a threshold voltage Vt of the input transistor 312. As the input transistor 312, a pMOS transistor is used, for example. Note that the input transistor 312 is an example of a first comparison element set forth in the claims.

In addition, it is desirable that the back gate and the source of the input transistor 312 are short-circuited in order to suppress a back gate effect.

The auto-zero switch 313 short-circuits the gate and the drain of the input transistor 312 in accordance with a control signal AZSW from the timing controller 220. As the auto-zero switch 313, a pMOS transistor is used, for example.

The current source 314 is inserted between the drain of the input transistor 312 and a predetermined reference potential. The current source 314 supplies a constant current. The current source 314 is achieved by an n-channel metal-oxide-semiconductor (nMOS) transistor or the like.

The band-limiting capacitor 315 is inserted between the source and the drain of the input transistor 312.

The clamp transistor 316 is inserted between the source and the drain of the input transistor 312, and the gate is connected to the clamp voltage controller 330. As the clamp transistor 316, an nMOS transistor is used, for example.

The clamp voltage controller 330 supplies a gate voltage corresponding to the voltage (input voltage VVSL) of the vertical signal line 259 to the gate of the clamp transistor 316. The clamp voltage controller 330 includes a capacitor 331 inserted between the vertical signal line 259 and the gate of the clamp transistor 316.

The clamp transistor 317 is inserted between the source and the drain of the input transistor 312, and a predetermined bias voltage $V_{bias}$ is applied to the gate. As the clamp transistor 317, an nMOS transistor is used, for example.

The clamp transistors 316 and 317 suppress a decrease in the comparison result Vout (in other words, low level) when the input transistor 312 is turned off. Among the clamp transistors, the clamp transistor 316 fixes the low level to a clamp voltage $V_{CLP}$ corresponding to the voltage (input voltage $V_{VSL}$) of the vertical signal line 259 with the gate voltage from the clamp voltage controller 330. In the above-described configuration, the low level is fixed to the clamp voltage $V_{CLP}$ lower than the input voltage $V_{VSL}$ by a predetermined value. The amplitude of the comparison result Vout can be made constant by the clamp transistor 316, whereby the linearity can be ensured. Here, the linearity means that the output (count value) of the ADC including the comparator 300 and the counter 261 is proportional to the input (input voltage $V_{VSL}$).

In addition, as the input voltage $V_{VSL}$ decreases, the low level (clamp voltage $V_{CLP}$) also decreases. Here, it is assumed that the transistor in the current source 314 operates in a linear region when the low level falls below a predetermined saturation voltage $V_{sat}$. The clamp transistor 317 limits the low level so as not to fall below the saturation voltage $V_{sat}$. The clamp transistor 317 allows the transistor in the current source 314 to operate in the saturation region.

A source of the output transistor 318 is connected to the vertical signal line 259, and the input voltage $V_{VSL}$ is input to the source. In addition, a gate of the output transistor 318 is connected to the drain of the input transistor 312, and the comparison result Vout is input thereto. As the output transistor 318, a pMOS transistor is used, for example. In addition, it is desirable that the back gate and the source of the output transistor 318 be short-circuited.

The output transistor 318 outputs, from a drain, a signal indicating whether or not a difference between the input voltage $V_{VSL}$ input to the source and the comparison result Vout input to the gate exceeds a predetermined threshold voltage as the output signal VCO. The output signal VCO is input to the counter 261.

Here, when the pixel signal and the reference signal substantially coincide with each other, the drain voltage (that is, the comparison result Vout) of the input transistor 312 varies according to the level of the pixel signal. Therefore, in a case where the comparison result Vout is directly input to the subsequent circuit, the timing at which the drain voltage is inverted may deviate from an ideal timing at which the pixel signal and the reference signal substantially coincide with each other.

Due to the connection in FIG. 6, the drain-source voltage of the input transistor 312 is input as the gate-source voltage of the output transistor 318. An amount of variation in the drain voltage of the input transistor 312 is equal to an amount of variation in the voltage of the pixel signal, and thus, the output signal VCO from the output transistor 318 is inverted at an ideal timing at which the pixel signal and the reference signal substantially coincide with each other. As described above, an error of the inversion timing can be suppressed by adding the output transistor 318.

The initialization switch 319 opens and closes a path between the gate and the drain of the output transistor 318 in accordance with a control signal GDSW from the timing controller 220.

The current source 320 is inserted between the drain of the output transistor 318 and the reference potential, and supplies a constant current. The current source 320 is implemented by an nMOS transistor or the like. The drain-source voltage of this transistor is hereinafter referred to as a "current source operating voltage".

Note that, although the band-limiting capacitor 315, the clamp transistor 317, and the output transistor 318 are disposed in the comparator 300, at least one of them may not be provided. In a case where the output transistor 318 is not provided, the initialization switch 319 and the current source 320 are unnecessary.

In addition, a logic gate (inverter or the like) having a different power supply voltage from the preceding stage can be inserted between the output transistor 318 and the counter 261. The power supply voltage can be converted by the logic gate.

The reference voltage $V_{RMP}$ at the start of AD conversion is set higher than that during auto-zeroing, and decreases with the lapse of time within an AD conversion period. Here, the AD conversion period is a period for the counter 261 to perform counting. At the start of the AD conversion period, the input transistor 312 in the first stage is turned off, a current flows through the clamp transistor 316, and a clamp voltage determined by the clamp transistor 316 is output as the comparison result Vout. The output transistor 318 in the second stage is turned on and outputs the input voltage $V_{VSL}$ as the output signal VCO.

Then, when the reference voltage $V_{RMP}$ decreases and the gate voltage of the input transistor 312 becomes lower than a value obtained by subtracting the threshold voltage Vt of the input transistor 312 from the input voltage $V_{VSL}$, the input transistor 312 in the first stage transitions to an on state, and the comparison result Vout is inverted to the input voltage $V_{VSL}$. The output transistor 318 in the second stage transitions to an off state, and the output signal VCO is inverted to the current source operating voltage.

In this manner, the comparator 300 compares the input voltage $V_{VSL}$ with the reference voltage $V_{RMP}$, and outputs either the input voltage $V_{VSL}$ or the current source operating voltage as the output signal VCO.

Figure 7:
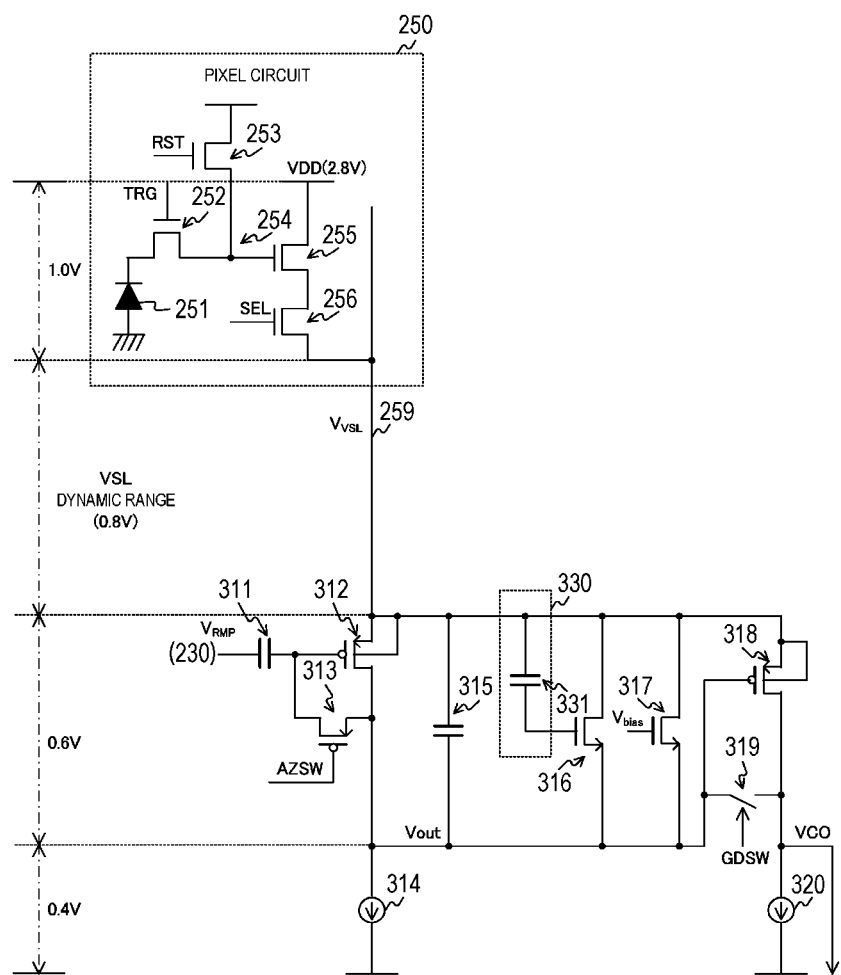
FIG. 7 is a diagram for describing a dynamic range of the solid-state imaging element according to the first embodiment of the present technology.

FIG. 7 is a diagram for describing a dynamic range of the solid-state imaging element 200 according to the first embodiment of the present technology. The drain-source voltage of the amplification transistor 255 in an on state in the pixel circuit 250 to which light is not incident is set to 1.0 volt (V). Further, the power supply voltage of the pixel circuit 250 is set to 2.8 volt (V). In this case, the maximum value of the voltage (that is, the input voltage $V_{VSL}$) of the vertical signal line 259 is 1.8 volts (V) lower than the power supply voltage of the pixel circuit 250 by 1.0 volts (V).

In addition, the current source operating voltage of the current source 314 is 0.4 volt (V), and the drain-source voltage of the input transistor 312 before inversion is 0.6 volt (V). In this case, the minimum value of the voltage of the vertical signal line 259 at which the linearity is ensured is 1.0 volt (V).

The voltage range of the vertical signal line 259 in which the linearity is ensured is from 1.0 volt (V) to 1.8 volt (V). The ratio between the minimum value and the maximum value of the voltage range corresponds to the dynamic range.

[Operation Example of Solid-State Imaging Element]

Figure 8:
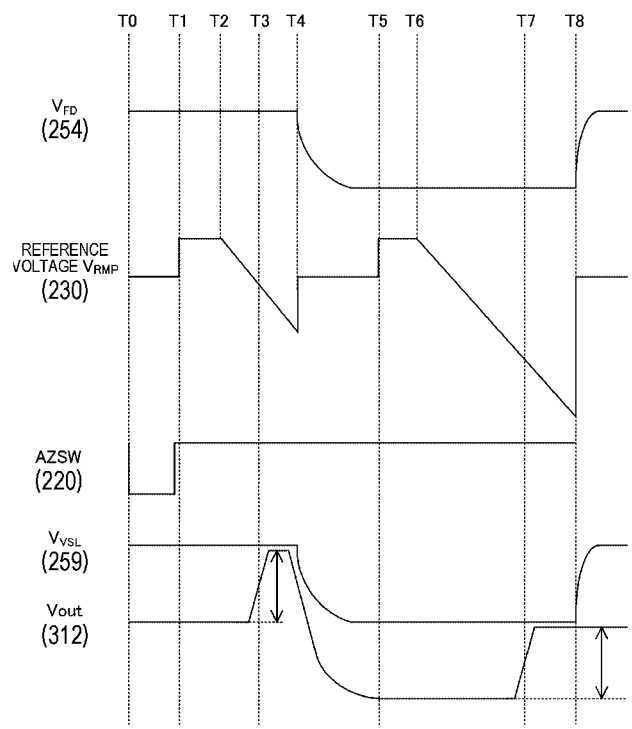
FIG. 8 is a timing chart illustrating an example of operation of the solid-state imaging element according to the first embodiment of the present technology.

FIG. 8 is a timing chart illustrating an example of operation of the solid-state imaging element 200 according to the first embodiment of the present technology. In FIG. 8, $V_{FD}$ represents the voltage of the floating diffusion layer 254.

During an auto-zero period from a timing T0 to a timing T1, the DAC 230 sets the reference voltage $V_{RMP}$ to an auto-zero potential. In addition, the timing controller 220 sets the control signal AZSW to a low level. Thus, the output signal VCO is at the auto-zero potential.

During a period from the timings T1 to T8, the timing controller 220 sets the control signal AZSW to a high level.

During a period from the timing T1 to the timing T2, the DAC 230 sets the reference voltage $V_{RMP}$ to be higher than the value during auto-zeroing. Thus, the input transistor 312 is turned off, and outputs the clamp voltage as the comparison result Vout.

Then, within a period from the timings T2 to T4, the DAC 230 decreases the reference voltage $V_{RMP}$ with the lapse of time. This period corresponds to a reset level AD conversion period. It is assumed that the difference between the reference voltage $V_{RMP}$ and the input voltage $V_{VSL}$ becomes less than the threshold voltage Vt of the input transistor 312 at the timing T3 within this period. At this time, the input transistor 312 transitions to the on state, and the comparison result Vout is inverted to the reset level.

In addition, during a period from the timing T5 to the timing T6, the DAC 230 sets the reference voltage $V_{RMP}$ to be higher than the value during auto-zeroing. Thus, the input transistor 312 is turned off, and outputs the clamp voltage as the comparison result Vout. The clamp voltage at that time is lower than the clamp voltage corresponding to the reset level.

Then, within a period from the timings T6 to T8, the DAC 230 decreases the reference voltage $V_{RMP}$ with the lapse of time. This period corresponds to a signal level AD conversion period. It is assumed that the difference between the reference voltage $V_{RMP}$ and the input voltage $V_{VSL}$ becomes less than the threshold voltage Vt at the timing T7 within this period. At this time, the comparison result Vout is inverted to a signal level.

Figure 9:
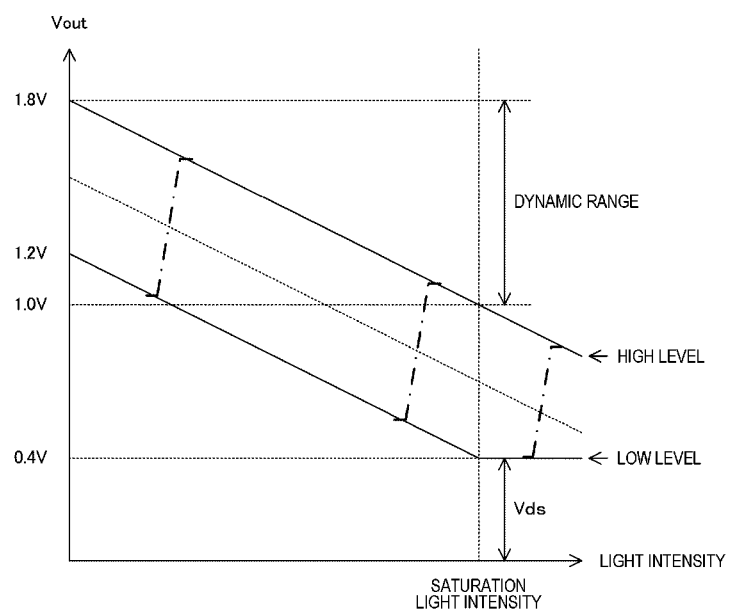
FIG. 9 is a graph illustrating an example of a relationship between an output of a first stage of the comparator and a light intensity in the first embodiment of the present technology.

FIG. 9 is a graph illustrating an example of a relationship between the output (comparison result Vout) of the first stage of the comparator and a light intensity in the first embodiment of the present technology. In FIG. 9, the vertical axis represents the high level and the low level of the comparison result Vout, and the horizontal axis represents light intensity.

When the light intensity is the minimum, the high level (that is, the voltage of the vertical signal line 259) of the comparison result Vout is 1.8 volts (V) that is the highest. The clamp transistor 316 clamps the low level of the comparison result Vout to 1.2 volts which is 0.6 volts (V) lower than the voltage of the vertical signal line 259.

Then, as the light intensity increases, the high level (voltage of the vertical signal line 259) and the low level (clamp voltage) of the comparison result Vout decrease. However, since the transistor in the current source 314 is operated in the saturation region, the low level is limited to 0.4 volt (V) or more by the clamp transistor 317. The light intensity when the clamp transistor 317 operates is referred to as a "saturation light intensity". The high level corresponding to the saturation light intensity is 1.0 volt (V).

As illustrated in FIG. 9, the amplitude of the comparison result Vout is constant in a region up to the saturation light intensity in which only the clamp transistor 316 operates. A dash-dot-dash line in FIG. 9 indicates a locus when the comparison result Vout is inverted. Since the amplitude of the comparison result Vout is constant, linearity is ensured.

On the other hand, in a region where the light intensity is equal to or more than the saturation light intensity and the clamp transistor 317 operates, the amplitude of the comparison result Vout decreases as the light intensity increases. As the amplitude of the comparison result Vout decreases, the linearity decreases.

When the linearity decreases, the image quality of the image data decreases, and thus, a voltage range up to the saturation light intensity in which the linearity is ensured and the high level of Vout is from 1.8 volt (V) to 1.0 volt (V) is used for AD conversion. The difference between the minimum value and the maximum value within the voltage range corresponds to the dynamic range.

Figure 10:
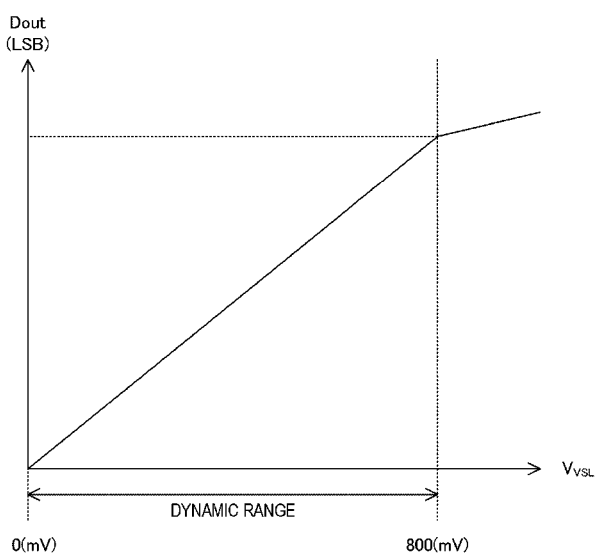
FIG. 10 is a graph illustrating an example of a relationship between a digital signal and an input voltage in the first embodiment of the present technology.

FIG. 10 is a graph illustrating an example of a relationship between the digital signal Dout and the input voltage $V_{VSL}$ in the first embodiment of the present technology. The vertical axis in FIG. 10 represents the digital signal Dout output from the ADC. The unit of the digital signal Dout is, for example, a least significant bit (LSB). The horizontal axis in FIG. 10 represents the input voltage $V_{VSL}$ input to the ADC, and the unit is, for example, millivolt (mV).

In a voltage range from 0 to 800 millivolts (mV), the clamp transistor 316 fixes the low level of the comparison result Vout to the clamp voltage corresponding to the input voltage $V_{VSL}$, whereby the amplitude of the output of the comparator 300 can be made constant. Thus, the output (digital signal Dout) of the ADC can be changed in proportion to the input (input voltage $V_{VSL}$). Within this range, the inclination of the digital signal Dout is constant.

On the other hand, the inclination of the digital signal Dout changes at 800 millivolts (mV) at which the clamp transistor 317 as well as the clamp transistor 316 operate. As described above, the linearity is maintained within the voltage range up to 800 millivolts (mV) in which only the clamp transistor 316 operates. Therefore, AD conversion is performed within this range, and the ratio between the maximum value and the minimum value of the range is the dynamic range of the input voltage $V_{VSL}$.

Figure 11:
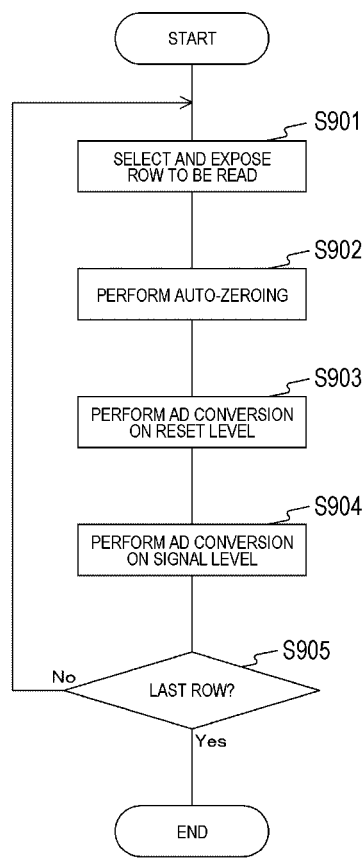
FIG. 11 is a flowchart illustrating an example of operation of the solid-state imaging element according to the first embodiment of the present technology.

FIG. 11 is a flowchart illustrating an example of operation of the solid-state imaging element 200 according to the first embodiment of the present technology. This operation is started, for example, when a predetermined application for capturing image data is executed.

The vertical scanning circuit 210 selects and exposes the row to be read (step S901). The auto-zero switch 313 performs auto-zeroing in accordance with the control signal AZSW (step S902). The column signal processor 260 performs AD conversion on the reset level for each column (step 903), and performs AD conversion on the signal level (step 904). Then, the vertical scanning circuit 210 determines whether or not the read row is the last row (step S905).

In a case where the read row is not the last row (step S905: No), the solid-state imaging element 200 repeats step S901 and the subsequent steps. On the other hand, in a case where the read row is the last row (step S905: Yes), the solid-state imaging element 200 ends the operation for imaging.

Note that the operation of the timing chart illustrated in FIG. 8 corresponds to steps S902 to S904 in FIG. 11.

When a plurality of image data is continuously captured, steps S901 to S905 are repeatedly executed in synchronization with the vertical synchronization signal.

As described above, according to the first embodiment of the present technology, the clamp transistor 316 fixes the low level of the comparison result Vout to the clamp voltage corresponding to the input voltage $V_{VSL}$, whereby the amplitude of the output of the comparator 300 can be made constant. Thus, the output (digital signal Dout) of the ADC can be changed in proportion to the input (input voltage $V_{VSL}$). In other words, the linearity of the ADC can be ensured.

[First Modification]

The first embodiment has described the configuration in which the low level of the comparison result Vout is fixed to the clamp voltage corresponding to the input voltage $V_{VSL}$ by adding the clamp transistor 316. However, in this configuration, the dynamic range may be insufficient. A first modification of the first embodiment is different from the first embodiment in that a voltage dividing circuit is provided in the clamp voltage controller 330 to expand a dynamic range.

Figure 12:
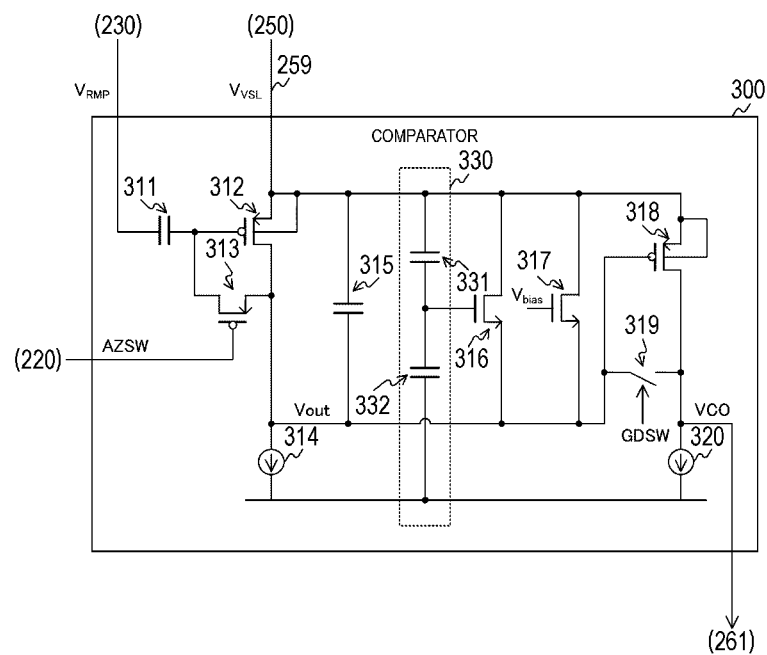
FIG. 12 is a circuit diagram illustrating a configuration example of a comparator in a first modification of the first embodiment of the present technology.

FIG. 12 is a circuit diagram illustrating a configuration example of a comparator 300 in the first modification of the first embodiment of the present technology. The comparator 300 is different from that of the first embodiment in that a capacitor 332 is added in the clamp voltage controller 330.

The capacitors 331 and 332 are connected in series between the vertical signal line 259 and the reference potential, and a connection node between them is connected to the gate of the clamp transistor 316. With this configuration, the voltage between the input voltage $V_{VSL}$ of the vertical signal line 259 and the reference potential is divided and supplied to the gate of the clamp transistor 316.

Figure 13:
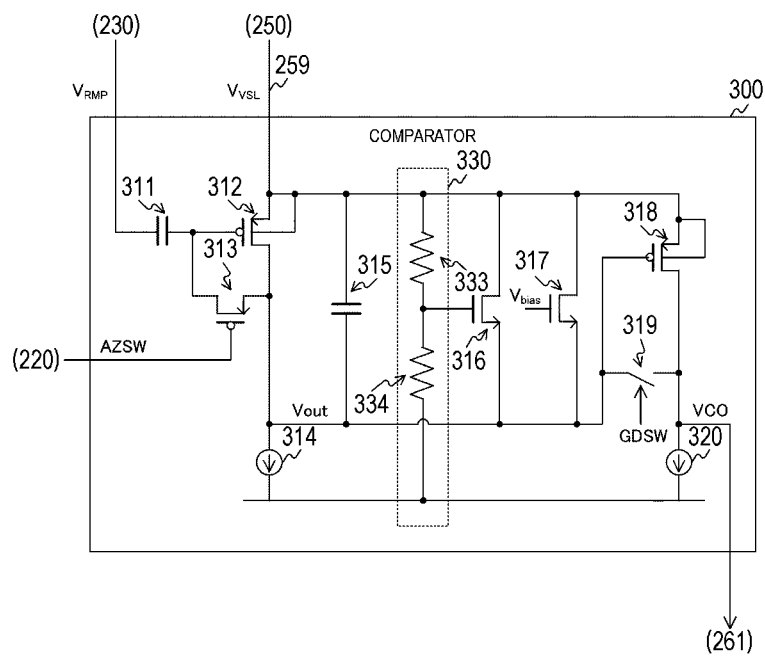
FIG. 13 is a circuit diagram illustrating a configuration example of a comparator in which voltage division is performed using a resistor in the first modification of the first embodiment of the present technology.

Note that, although the voltage is divided by the capacitors 331 and 332, the configuration of the voltage dividing circuit is not limited thereto. For example, as illustrated in FIG. 13, the capacitors 331 and 332 can also be replaced with resistors 333 and 334. Furthermore, an nMOS transistor having a gate to which a fixed potential is applied can be further connected in parallel with the clamp transistor 316. Note that the clamp transistor 316 is an example of a first clamp transistor set forth in the claims. The added nMOS transistor is an example of a second clamp transistor set forth in the claims.

Figure 14:
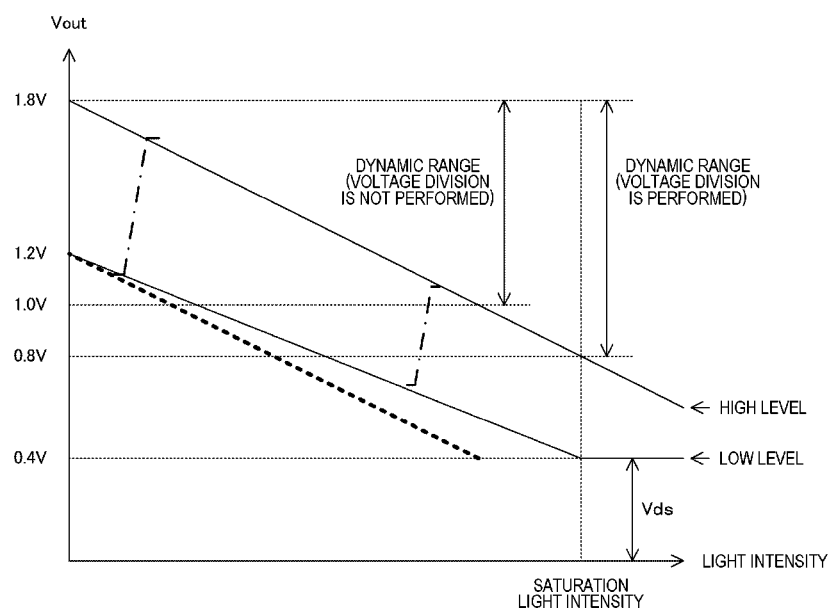
FIG. 14 is a graph illustrating an example of a relationship between an output of a first stage of the comparator and a light intensity in the first modification of the first embodiment of the present technology.

FIG. 14 is a graph illustrating an example of a relationship between the output (comparison result Vout) of the first stage of the comparator 300 and a light intensity in the first modification of the first embodiment of the present technology. In FIG. 14, the vertical axis represents high level and low level of the comparison result Vout, and the horizontal axis represents light intensity. In addition, a dotted line indicates a variation of the low level of the first embodiment in which the voltage division is not performed.

As illustrated in FIG. 14, the inclination of the low level is smaller when the voltage division is performed than when the voltage division is not performed. As a result, the value of the high level corresponding to the saturation light intensity at which the clamp transistor 317 operates is lower than that in a case where voltage division is not performed.

For example, the value of the high level corresponding to the saturation light intensity in a case where the voltage division is not performed is 1.0 volt (V), while the value of the high level corresponding to the saturation light intensity in a case where the voltage division is performed is 0.8 volt (V). Accordingly, in a case where the voltage division is performed, the voltage range in which the linearity is maintained can be widened as compared with the case where the voltage division is not performed. Due to an increase in the voltage range, the dynamic range can be widened.

Here, a setting example of the capacitance value of each of the capacitors 331 and 332 will be described. The following equation is obtained from the operating point in the initial state.

$$Q1_{init} = (V_{VSL\_init} - VG_{init}) \times C1 \qquad \text{Equation 1}$$

$$Q2_{init} = (VG_{init}) \times C2 \qquad \text{Equation 2}$$

$Q1_{init}$ in Equation 1 indicates a charge amount in the capacitor 331 at the time of initialization. $V_{VSL\_init}$ indicates an initial value of the voltage (input voltage $V_{VSL}$) of the vertical signal line 259. $VG_{init}$ indicates an initial value of the gate voltage of the clamp transistor 316. C1 indicates a capacitance value of the capacitor 331. A method for setting various initial values will be described later. In addition, $Q2_{init}$ in Equation 2 indicates a charge amount in the capacitor 332 at the time of initialization, and C2 indicates a capacitance value of the capacitor 332.

In addition, the following equation is obtained from the operating point at the time of saturation.

$$Q1_{sat} = (V_{VSL\_sat} - VG_{sat}) \times C1 \qquad \text{Equation 3}$$

$$Q2_{sat} = (VG_{sat}) \times C2 \qquad \text{Equation 4}$$

$Q1_{sat}$ in Equation 3 indicates a charge amount in the capacitor 331 at the time of saturation. $V_{VSL\_sat}$ indicates a voltage of the vertical signal line 259 at the time of saturation. $VG_{sat}$ indicates a gate voltage at the time of saturation. Further, $Q2_{sat}$ in Equation 4 indicates a charge amount in the capacitor 332 at the time of saturation.

In addition, since a variation in the charge amount at the time of initialization and a variation in the charge amount at the time of saturation are the same, the following equation is established.

$$Q1_{init} - Q1_{sat} = Q2_{init} - Q2_{sat} \quad \text{Equation 5}$$

When Equations 1 to 4 are substituted into Equation 5 and transformed, the following equation is obtained.

$$(V_{VSL\_init} - V_{VSL\_sat})/(VG_{init} - VG_{sat}) = C2/C1 \quad \text{Equation 6}$$

Given that $V_{VSL\_init}$ is 1.8 volt (V), $V_{VSL\_sat}$ is 0.8 volt (V), $VG_{init}$ is 1.4 volt (V), and $VG_{sat}$ is 0.6 volt (V), C2 is ¼ of C1 according to Equation 6. Therefore, when C1 is, for example, 10 femtofarad (fF), C2 is 2.5 femtofarad (fF).

As described above, according to the first modification of the first embodiment of the present technology, the clamp voltage controller 330 divides the voltage between the input voltage $V_{VSL}$ and the reference potential, and thus, the voltage range in which the linearity is maintained can be widened as compared with a case where the voltage is not divided. With this configuration, the dynamic range can be widened as compared with the case where the voltage is not divided.

[Second Modification]

In the first modification of the first embodiment, the gate voltage of the clamp transistor 316 is controlled by the voltage dividing circuit. Meanwhile, an initial value of the gate voltage is desirably set with the input voltage $V_{VSL}$ of the vertical signal line 259 as a reference. A solid-state imaging element 200 according to a second modification of the first embodiment is different from that of the first modification of the first embodiment in that the input voltages Vysi of the vertical signal lines 259 are sampled and initialization is performed on the basis of the sampled voltage.

Figure 15:
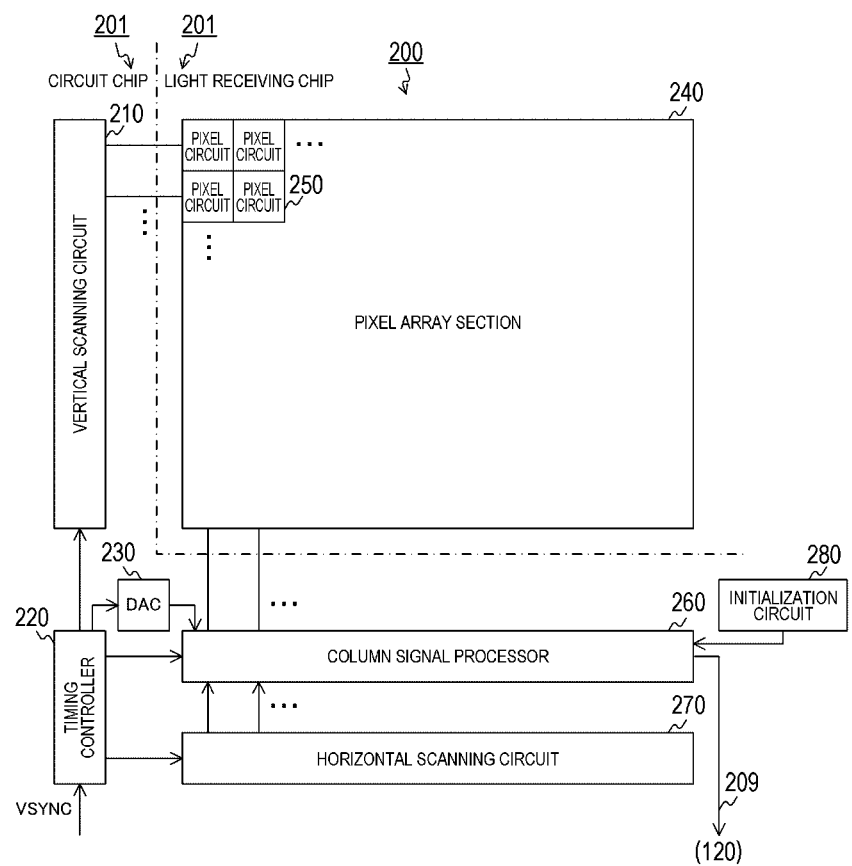
FIG. 15 is a block diagram illustrating a configuration example of a solid-state imaging element according to a second modification of the first embodiment of the present technology.

FIG. 15 is a block diagram illustrating a configuration example of the solid-state imaging element 200 according to the second modification of the first embodiment of the present technology. The solid-state imaging element 200 according to the second modification of the first embodiment is different from that of the first modification of the first embodiment in further including an initialization circuit 280. The details of the initialization circuit 280 will be described later.

Figure 16:
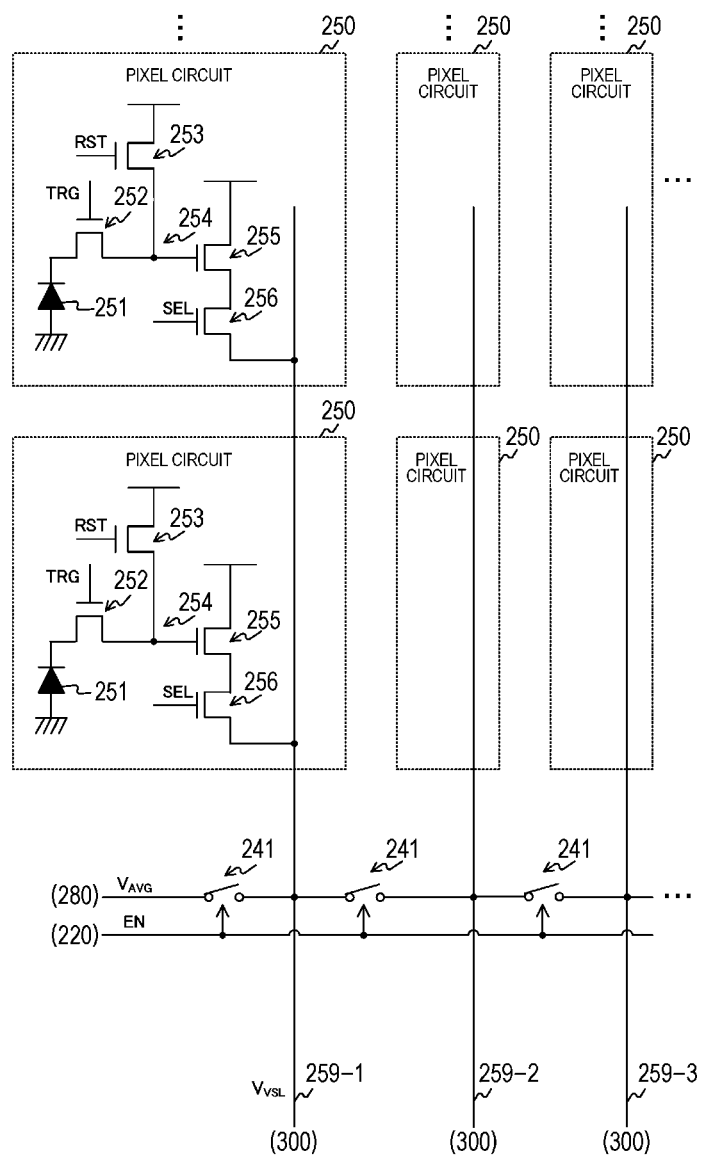
FIG. 16 is a circuit diagram illustrating a configuration example of a pixel array section in the second modification of the first embodiment of the present technology.

FIG. 16 is a circuit diagram illustrating a configuration example of a pixel array section 240 in the second modification of the first embodiment of the present technology. The pixel array section 240 according to the second modification of the first embodiment is different from the first modification of the first embodiment in that a horizontal connection switch 241 is further provided for each column.

When the number of columns is N, N horizontal connection switches 241 are disposed. In addition, an n-th (n is an integer of 1 to N) vertical signal line 259 is defined as a vertical signal line 259-n.

The horizontal connection switch 241 in the first column opens and closes a path between the vertical signal line 259-1 and the initialization circuit 280 in accordance with an enable signal EN from the timing controller 220. The horizontal connection switch 241 in the nth column from the second column opens and closes a path between the vertical signal line 259-(n-1) and the vertical signal line 259-n according to the enable signal EN. By these horizontal connection switches 241, the N vertical signal lines 259 are horizontally connected in the row direction within the auto-zero period. These horizontal connection switches 241 are provided in either the light receiving chip 201 or the circuit chip 202 (for example, the circuit chip 202).

Figure 17:
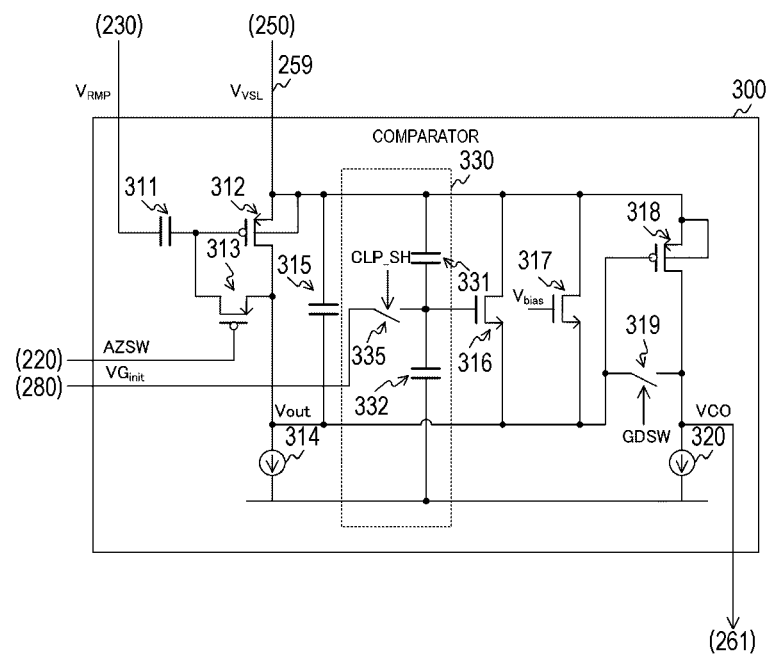
FIG. 17 is a circuit diagram illustrating a configuration example of a comparator in the second modification of the first embodiment of the present technology.

FIG. 17 is a circuit diagram illustrating a configuration example of a comparator 300 in the second modification of the first embodiment of the present technology. The comparator 300 according to the second modification of the first embodiment is different from that of the first modification of the first embodiment in further including an initialization switch 335.

The initialization switch 335 opens and closes a path between the gate of the clamp transistor 316 and the initialization circuit 280 in accordance with a control signal CLP_SH from the timing controller 220. $VG_{init}$ which is an initial value of the gate voltage is supplied from the initialization circuit 280.

Figure 18A:
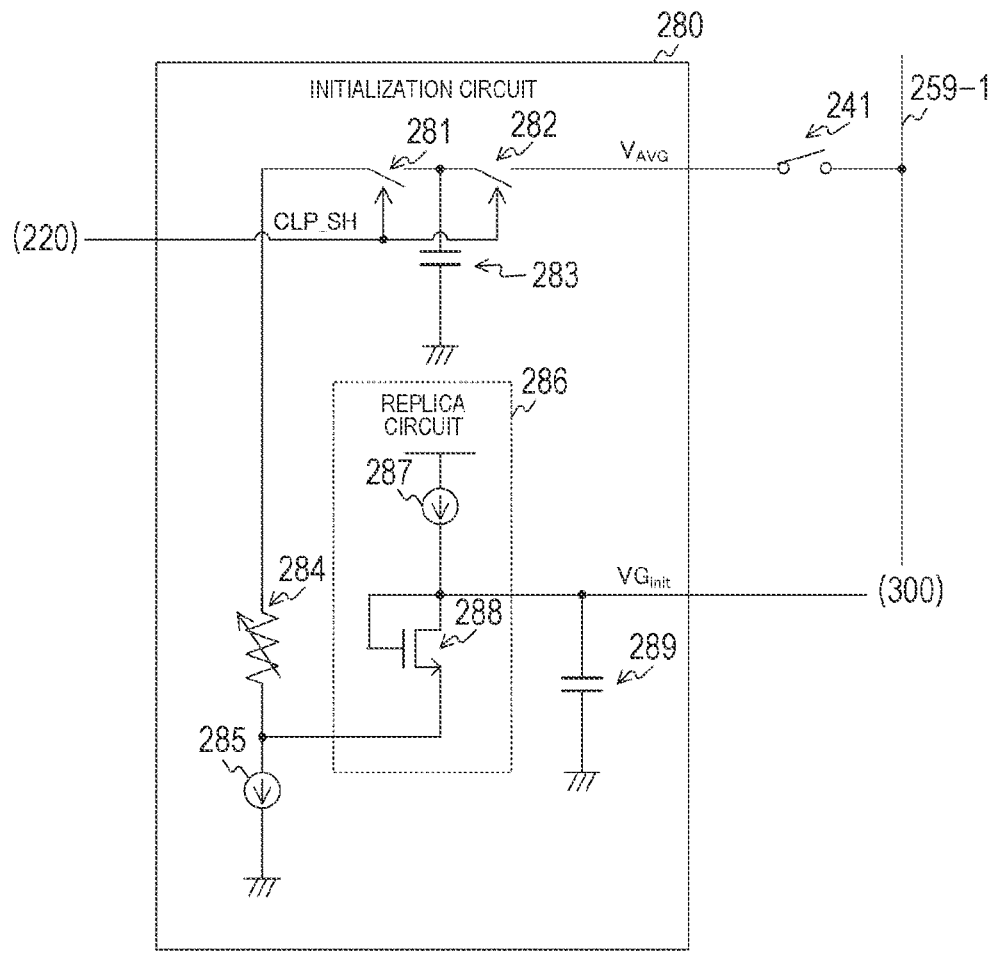
FIGS. 18A and 18B are circuit diagrams illustrating a configuration example of an initialization circuit in the second modification of the first embodiment of the present technology.
Figure 18B:
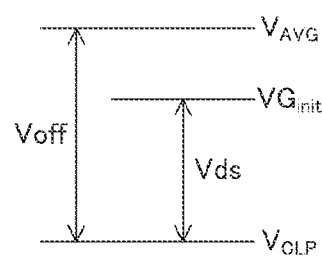

FIGS. 18A and 18B are circuit diagrams illustrating a configuration example of the initialization circuit 280 in the second modification of the first embodiment of the present technology. FIG. 18A is a circuit diagram illustrating a configuration example of the initialization circuit 280, and FIG. 18B is a diagram for describing a method for setting an initial value of the gate voltage.

As illustrated in FIG. 18A, the initialization circuit 280 includes sample switches 281 and 282, hold capacitors 283 and 289, a variable resistor 284, a current source 285, and a replica circuit 286.

The sample switch 282 opens and closes a path between the horizontal connection switch 241 and one end of the hold capacitor 283 in accordance with a control signal CLP_SH from the timing controller 220. The other end of the hold capacitor 283 is grounded. The sample switch 281 opens and closes a path between one end of the hold capacitor 283 and one end of the variable resistor 284 in accordance with the control signal CLP_SH. The other end of the variable resistor 284 is connected to one end of the current source 285. The other end of the current source 285 is grounded.

Further, the replica circuit 286 includes a current source 287 and an nMOS transistor 288. The current source 287 and the nMOS transistor 288 are connected in series between a power supply voltage and a connection node of the variable resistor 284 and the current source 285. Furthermore, a gate and a drain of the nMOS transistor 288 are short-circuited. The voltage at the connection node of the current source 287 and the nMOS transistor 288 is supplied to the comparator 300 of each column as a gate voltage $VG_{init}$.

In addition, a current by the current source 287 in the replica circuit 286 is set to M times the current by the current source 314 for each column. In addition, the gate width of the nMOS transistor 288 is set to M times that of the clamp transistor 316 for each column. Here, M may be a number different from N.

The timing controller 220 closes the horizontal connection switch 241 by the enable signal EN and closes the sample switches 281 and 282 by the control signal CLP_SH within the auto-zero period. As a result, the vertical signal lines 259-1 to 259-N are horizontally connected, and an average value of their voltages is sampled as $V_{AVG}$. The sampled average voltage $V_{AVG}$ is held in the hold capacitor 283. The sampled voltage $V_{AVG}$ drops in potential by the variable resistor 284, and a drop amount thereof is defined as Voff. In addition, when the drain-source voltage of the nMOS transistor 288 is Vds, the gate voltage $VG_{init}$ is expressed by the following equation.

$$VG_{init} = V_{AVG} - Voff + Vds$$

Since the voltage of the vertical signal line 259 during auto-zeroing is the largest, the gate voltage can be initialized to a value corresponding to the maximum value by the sampling during auto-zeroing. In addition, Voff in the above equation is set to a desired amplitude of the comparison result Vout. The resistance value of the variable resistor 284 is determined according to a desired amplitude value.

As illustrated in FIG. 18B, the difference between the voltage VAVG and the amplitude Voff corresponds to the clamp voltage VCLP. As illustrated in FIGS. 18A and 18B, the initialization circuit 280 samples and holds the average of the voltages of the vertical signal lines 259, and initializes the gate voltage on the basis of the held voltage. With this gate voltage, the clamp voltage VCLP is controlled to an appropriate value corresponding to the average of the voltages of the vertical signal lines 259. Note that the initialization circuit 280 can also sample and hold signals of any of OPB pixels, dummy non-OPB pixels, and dummy OPB pixels to be described later.

Figure 19:
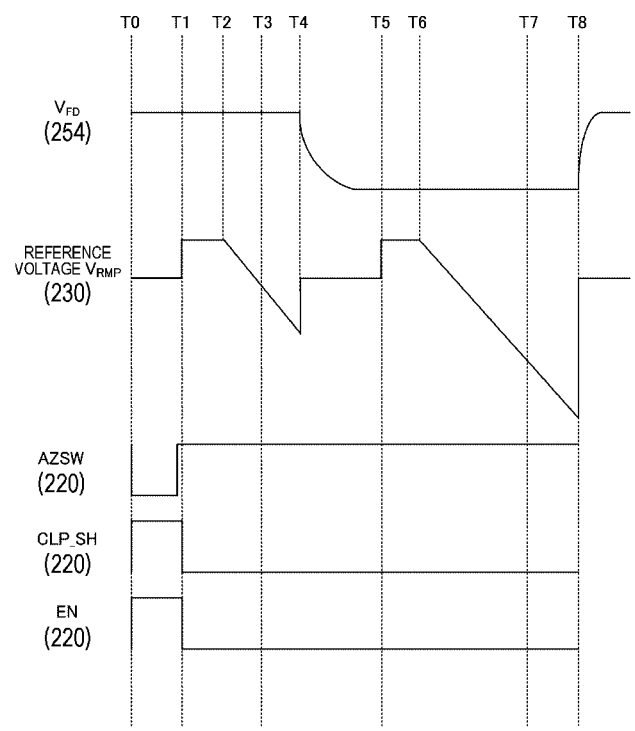
FIG. 19 is a timing chart illustrating an example of operation of the solid-state imaging element according to the second modification of the first embodiment of the present technology.

FIG. 19 is a timing chart illustrating an example of operation of the solid-state imaging element 200 according to the second modification of the first embodiment of the present technology.

During the auto-zero period from the timings T0 to T1, the timing controller 220 sets the control signal AZSW to the low level and closes the auto-zero switch 313. In addition, the timing controller 220 sets the control signal CLP_SH to the high level to sample the voltages of the vertical signal lines 259, and sets the enable signal EN to the high level to close the horizontal connection switch 241. During a period from the timing T1 to the next auto-zero period, the control signal AZSW is controlled to the high level, and the control signal CLP_SH and the enable signal EN are controlled to the low level.

As described above, in the second modification of the first embodiment of the present technology, the initialization circuit 280 samples the average of the voltages of the vertical signal lines 259, holds the sampled voltage, and initializes the gate voltage on the basis of the held voltage. With this gate voltage, the clamp voltage is controlled to an appropriate value corresponding to the average of the voltages of the vertical signal lines 259.

[Third Modification]

In the first modification of the first embodiment described above, the clamp voltage controller 330 divides the voltage between the input voltage $V_{VSL}$ and the reference potential. However, in the case where the voltage is divided, a conversion gain of the ADC decreases as compared with the case where the voltage is not divided. A solid-state imaging element 200 according to a third modification of the first embodiment is different from that of the first modification of the first embodiment in that a conversion gain is corrected by a digital circuit.

Figure 20:
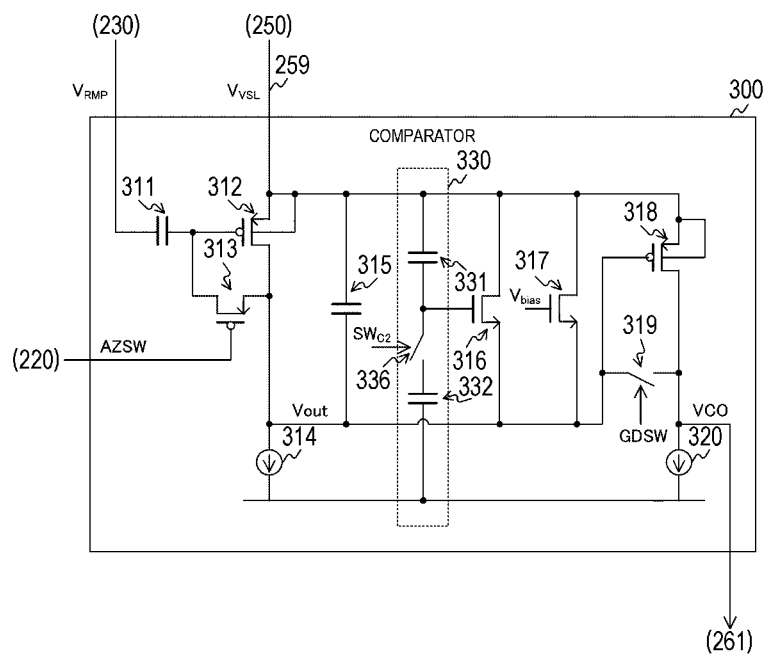
FIG. 20 is a circuit diagram illustrating a configuration example of a comparator in a third modification of the first embodiment of the present technology.

FIG. 20 is a circuit diagram illustrating a configuration example of a comparator 300 in the third modification of the first embodiment of the present technology. The comparator 300 according to the third modification of the first embodiment is different from the first modification of the first embodiment in further including a capacitor connection switch 336 in the clamp voltage controller 330.

The capacitor connection switch 336 opens and closes a path between one end of the capacitor 332 and the gate of the clamp transistor 316 in accordance with a control signal $SW_{C2}$ from the timing controller 220.

In the third modification of the first embodiment, a calibration period for correcting the conversion gain of the ADC is provided before the start of imaging. The calibration period includes a voltage division period and a non-voltage division period.

The timing controller 220 controls the capacitor connection switch 336 to be closed by the control signal $SW_{C2}$ within the voltage division period of the calibration period, and controls the capacitor connection switch 336 to be opened within the non-voltage division period. After the calibration period elapses, the capacitor connection switch 336 is controlled to be closed.

Figure 21:
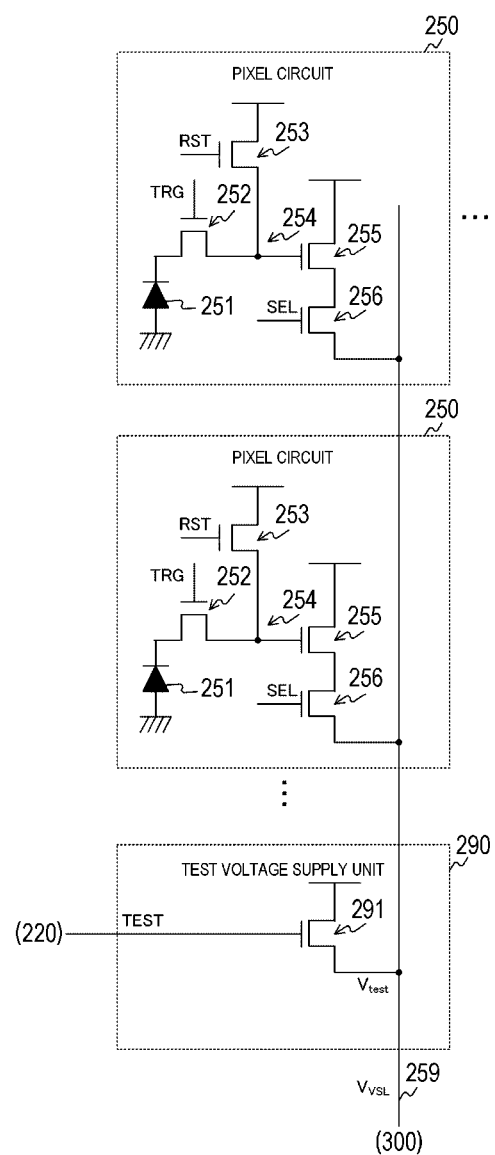
FIG. 21 is a circuit diagram illustrating a configuration example of a pixel array section in the third modification of the first embodiment of the present technology.

FIG. 21 is a circuit diagram illustrating a configuration example of a pixel array section 240 in the third modification of the first embodiment of the present technology. In the pixel array section 240 according to the third modification of the first embodiment, a test voltage supply unit 290 is disposed for each column. The test voltage supply unit 290 includes an nMOS transistor 291.

The nMOS transistor 291 is inserted between the vertical signal line 259 of the corresponding column and the power supply voltage. A control signal TEST from the timing controller 220 is input to a gate of the nMOS transistor 291. The nMOS transistor 291 supplies a test voltage $V_{test}$ in accordance with the control signal TEST. The nMOS transistor 291 is provided in either the light receiving chip 201 or the circuit chip 202 (for example, the circuit chip 202).

Figure 22:
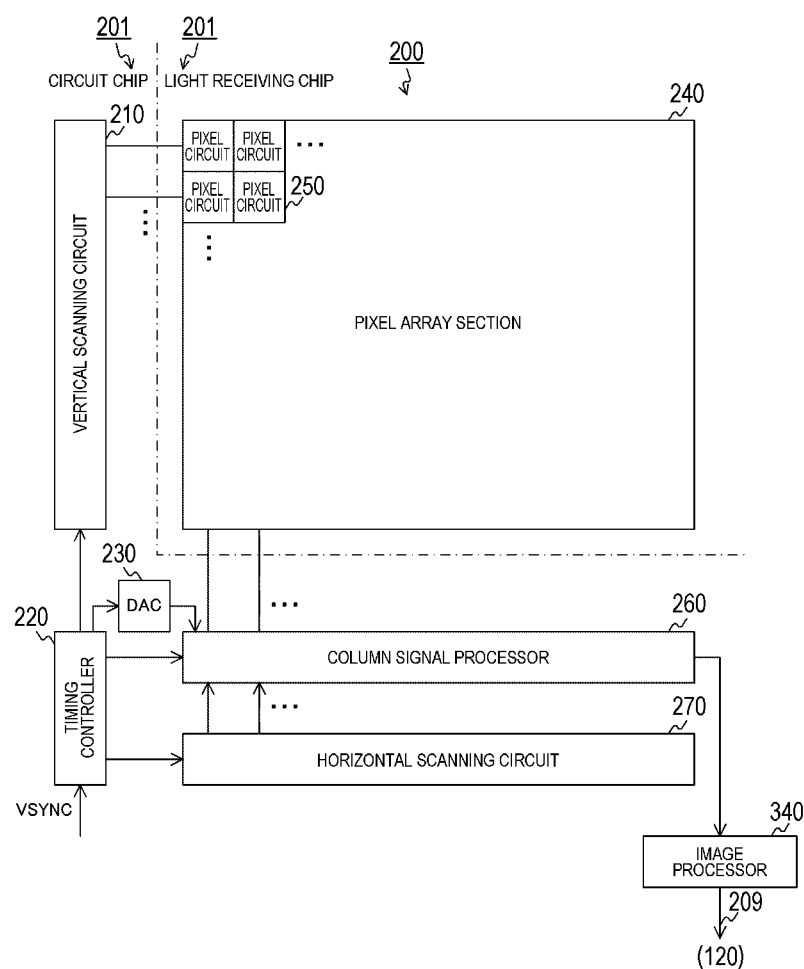
FIG. 22 is a block diagram illustrating a configuration example of a solid-state imaging element according to the third modification of the first embodiment of the present technology.

FIG. 22 is a block diagram illustrating a configuration example of the solid-state imaging element 200 according to the third modification of the first embodiment of the present technology. The solid-state imaging element 200 according to the third modification of the first embodiment is different from that of the first modification of the first embodiment in further including an image processor 340.

Figure 23:
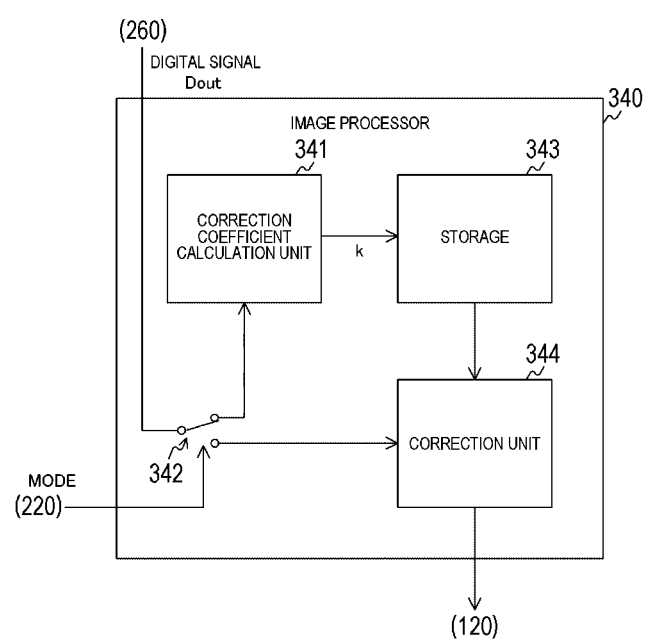
FIG. 23 is a block diagram illustrating a configuration example of an image processor in the third modification of the first embodiment of the present technology.

FIG. 23 is a block diagram illustrating a configuration example of the image processor 340 in the third modification of the first embodiment of the present technology. The image processor 340 includes a correction coefficient calculation unit 341, a selector 342, a storage 343, and a correction unit 344.

The selector 342 switches the output destination of the digital signal Dout from the column signal processor 260 in accordance with a mode signal MODE from the timing controller 220. The mode signal MODE is a signal indicating one of a plurality of modes including a calibration mode and an imaging mode. The calibration mode is set within the calibration period, and the imaging mode is set within the imaging period.

The selector 342 supplies the digital signal Dout to the correction coefficient calculation unit 341 in the calibration mode, and supplies the digital signal Dout to the correction unit 344 in the imaging mode.

The correction coefficient calculation unit 341 calculates a correction coefficient for correcting the conversion gain of the ADC using the digital signal Dout. A method for calculating the correction coefficient will be described later. The correction coefficient calculation unit 341 makes the storage 343 hold the calculated correction coefficient.

The correction unit 344 reads the correction coefficient from the storage 343 and corrects the digital signal Dout with the correction coefficient. The correction unit 344 supplies the corrected digital signal Dout to the DSP circuit 120.

Figure 24:
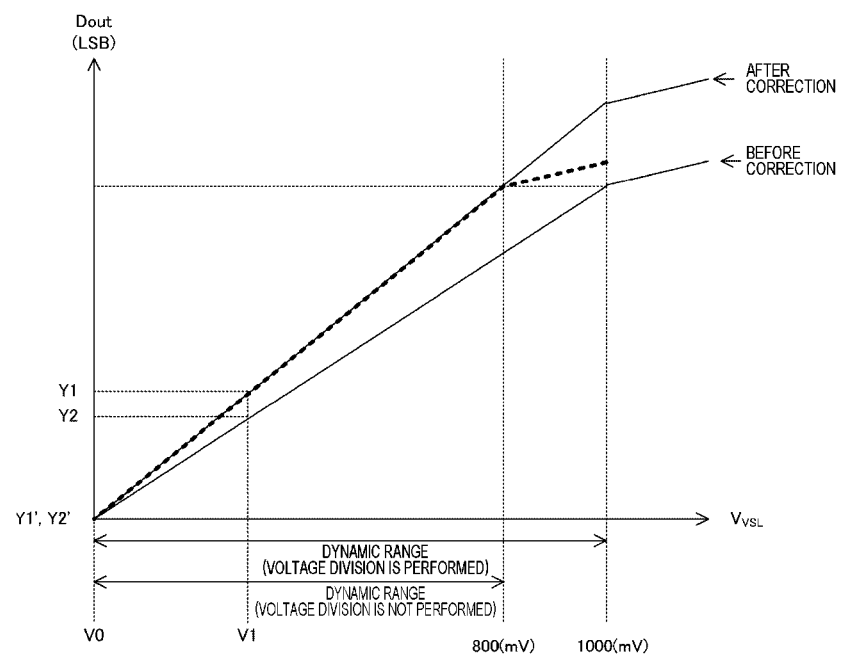
FIG. 24 is a graph illustrating an example of a relationship between a digital signal and an input voltage in the third modification of the first embodiment of the present technology.

FIG. 24 is a graph illustrating an example of a relationship between the digital signal Dout and the input voltage $V_{VSL}$ in the third modification of the first embodiment of the present technology. In FIG. 24, the vertical axis represents the digital signal Dout, and the horizontal axis represents the input voltage $V_{VSL}$. In addition, a dotted line indicates input/output characteristics of the first embodiment in which the voltage division is not performed.

The inclination (in other words, the conversion gain) of the digital signal Dout is smaller when the voltage division is performed than when the voltage division is not performed. In view of this, the correction coefficient calculation unit 341 sets the conversion gain in the case where the voltage division is not performed as a target value, and corrects the conversion gain in the case where the voltage division is performed to the target value in the calibration mode.

During the non-voltage division period in which voltage division is not performed in the calibration period, the test voltage supply unit 290 in each column sequentially supplies a black level V0 and a white level V1 as test voltages. A digital signal corresponding to the black level V0 in that case is set to Y1', and a digital signal corresponding to the white level V1 in that case is set to Y1.

In addition, during the voltage division period in which voltage division is performed, the test voltage supply unit 290 of each column sequentially supplies the black level V0 and the white level V1 as the test voltages. A digital signal corresponding to the black level V0 in that case is set to Y2', and a digital signal corresponding to the white level V1 in that case is set to Y2.

The correction coefficient calculation unit 341 calculates a correction coefficient k for each column from the digital signals Y1, Y2, Y1', and Y2' for each column by using, for example, the following equation.

$$k=(Y1-Y1')/(Y2-Y2') \quad \text{Equation 7}$$

In the imaging mode, the correction unit 344 multiplies the digital signal Dout by the corresponding correction coefficient k for each column. As a result, the conversion gain is corrected to a value equivalent to that in a case where the voltage division is not performed. Due to the correction of the conversion gain, the sensitivity of the solid-state imaging element 200 can be improved as compared with that before the conversion gain is corrected.

Note that, although all of the digital signals Y1, Y2, Y1', and Y2' are used, the configuration is not limited thereto. The digital signals Y1' and Y2' corresponding to the black level V0 have substantially the same value, and thus, it is also possible to adopt a configuration in which these values are not obtained. In this case, the correction coefficient k is calculated only by the digital signals Y1 and Y2.

In addition, although the correction coefficient k is calculated for each column, the configuration is not limited thereto. For example, the correction coefficient calculation unit 341 can calculate statistics (such as a total and an average) of the digital signals Y1, Y2, Y1', and Y2' of all the columns, and calculate the same correction coefficient in all the columns from the statistics. For example, when the averages of the digital signals Y1, Y2, Y1', and Y2' are Y1AVG, $Y2_{AVG}$, $Y1_{AVG}'$, and $Y2_{AVG}'$, a correction coefficient k' is calculated by the following equation instead of Equation 7.

$$k'=(Y1_{AVG}-Y1_{AVG}')/(Y2_{AVG}-Y2_{AVG}')$$

Note that the second modification for performing initialization can also be applied to the third modification of the first embodiment.

As described above, according to the third modification of the first embodiment of the present technology, the image processor 340 corrects the conversion gain of the ADC, whereby the sensitivity of the solid-state imaging element 200 can be improved.

Fourth Modification

In the first modification of the first embodiment described above, the clamp voltage controller 330 divides the voltage between the input voltage $V_{VSL}$ and the reference potential. However, in the case where the voltage is divided, a conversion gain of the ADC decreases as compared with the case where the voltage is not divided. A solid-state imaging element 200 according to a third modification of the first embodiment is different from the first modification of the first embodiment in that a conversion gain is corrected by an analog circuit.

Figure 25:
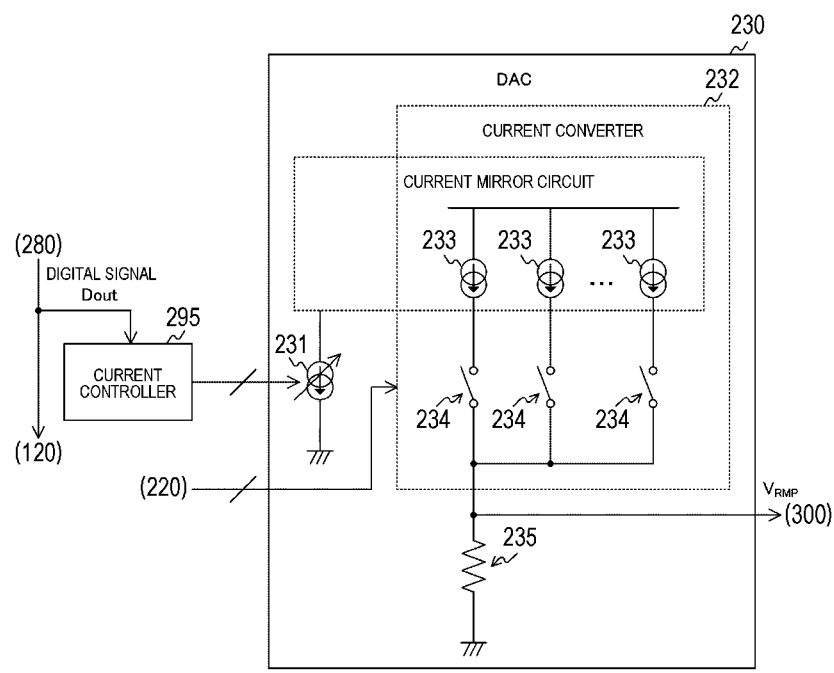
FIG. 25 is a circuit diagram illustrating a configuration example of a DAC in a fourth modification of the first embodiment of the present technology.

FIG. 25 is a circuit diagram illustrating a configuration example of a DAC 230 in the fourth modification of the first embodiment of the present technology. The DAC 230 according to the fourth modification of the first embodiment includes a variable current source 231, a current converter 232, and a resistor 235. The current converter 232 includes a plurality of current sources 233 and a plurality of switches 234. The switch 234 is provided for each current source 233.

The current source 233 is connected in parallel to the power supply voltage. The switch 234 opens and closes a path between the corresponding current source 233 and one end of the resistor 235 in accordance with a digital signal from the timing controller 220. The other end of the resistor 235 is grounded. The voltage at a connection node between the resistor 235 and the current converter 232 is supplied to the comparator 300 as a reference voltage $V_{RMP}$.

In addition, the solid-state imaging element 200 according to the fourth modification of the first embodiment is different from that of the first modification of the first embodiment in further including a current controller 295.

The current of the variable current source 231 is copied to each of the plurality of current sources 233 by a current mirror circuit. In addition, the digital signal is converted into an analog current signal by the current converter 232. The current signal is converted into a reference voltage $V_{RMP}$ by the resistor 235.

The current controller 295 controls the reference voltage $V_{RMP}$ by changing the current of the variable current source 231 on the basis of the digital signal Dout. In the calibration mode, the current controller 295 obtains k from Equation 7 and holds the obtained k. It is to be noted, however, that, in the fourth modification of the first embodiment, k is not used to correct the digital signal. The current controller 295 decreases an amount of current of the variable current source 231 as k increases. As a result, the reference voltage $V_{RMP}$ decreases, and the conversion gain of the ADC increases. Thus, the conversion gain is corrected by the analog circuit. Note that, instead of the current controller 295, a control circuit that controls a slope of the reference voltage and an offset voltage on the basis of the correction coefficient k may be provided. The control circuit and the current controller 295 are examples of a controller set forth in the claims.

Figure 26:
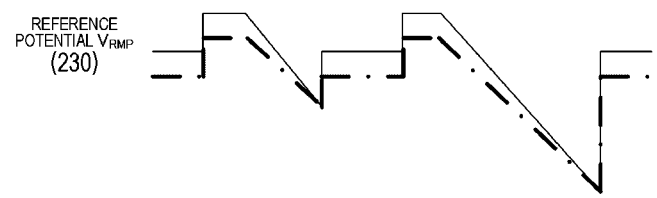
FIG. 26 is a circuit diagram illustrating an example of a waveform of a reference signal in the fourth modification of the first embodiment of the present technology.

FIG. 26 is a circuit diagram illustrating an example of a waveform of a reference signal in the fourth modification of the first embodiment of the present technology. A solid line in FIG. 26 indicates the waveform of the reference signal before correction, and a dash-dot-dash line indicates the waveform of the reference signal after correction. As illustrated in FIG. 26, the current controller 295 decreases the voltage of the reference signal as k increases. As a result, the time until the output of the comparator 300 is inverted is increased, and the conversion gain is increased. That is, the current controller 295 corrects the conversion gain. This makes it possible to improve the sensitivity of the solid-state imaging element 200.

Note that the second modification for performing initialization can also be applied to the fourth modification of the first embodiment.

As described above, according to the fourth modification of the first embodiment of the present technology, the current controller 295 corrects the conversion gain of the ADC, whereby the sensitivity of the solid-state imaging element 200 can be improved.

2. Second Embodiment

In the first embodiment described above, the timing controller 220 controls the auto-zero switch 313 from the on state to the off state by the control signal AZSW. However, in this configuration, the drain voltage of the input transistor 312 may fluctuate due to reset feedthrough when the auto-zero switch 313 is switched from the on state to the off state. As a result, noise such as fixed pattern noise may occur, and the image quality of the image data may be deteriorated. A solid-state imaging element 200 according to the second embodiment is different from that of the first embodiment in that reset feedthrough is suppressed by supplying a control signal AZSW corresponding to a voltage of the vertical signal line 259.

Figure 27:
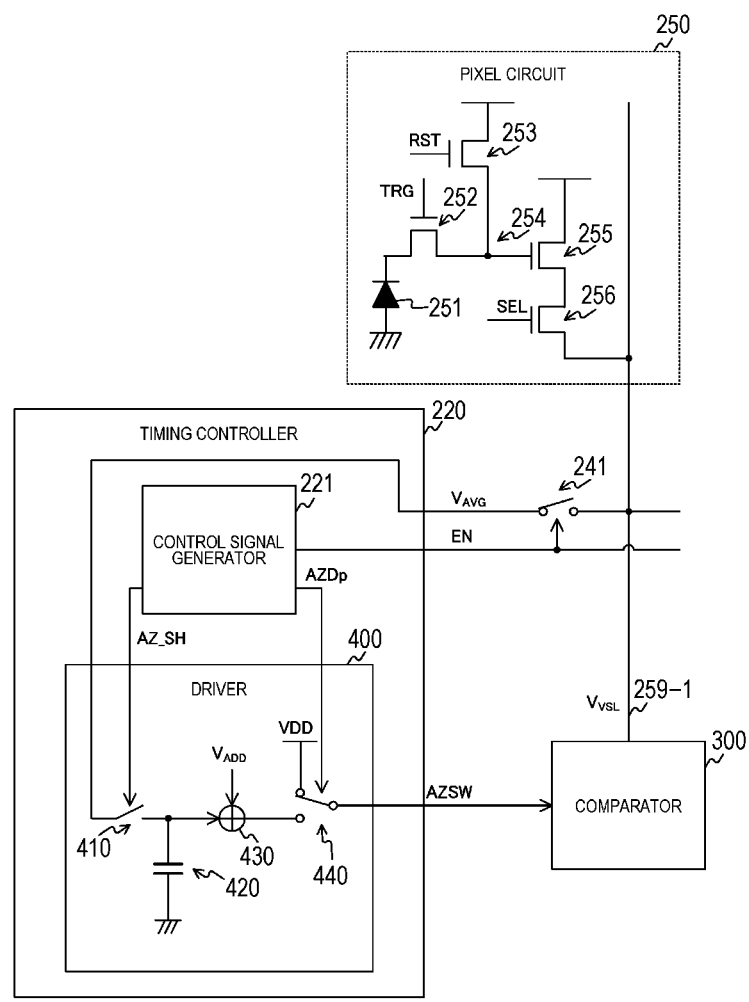
FIG. 27 is a circuit diagram illustrating a configuration example of a timing controller in a second embodiment of the present technology.

FIG. 27 is a circuit diagram illustrating a configuration example of a timing controller 220 in the second embodiment of the present technology. The timing controller 220 in the second embodiment includes a control signal generator 221 and a driver 400. The driver 400 includes a sample switch 410, a hold capacitor 420, a level shifter 430, and a selector 440.

In addition, the solid-state imaging element 200 according to the second embodiment is provided with a horizontal connection switch 241 for each vertical signal line as in the second modification of the first embodiment.

The control signal generator 221 generates signals such as an enable signal EN, a control signal AZ_SH, and a control signal AZDp. The enable signal EN is supplied to the horizontal connection switch 241, and the control signal AZ_SH and the control signal AZDp are supplied to the driver 400.

The sample switch 410 opens and closes a path between the horizontal connection switch 241 and one end of the hold capacitor 420 in accordance with the control signal AZ_SH. The other end of the hold capacitor 420 is grounded. The level shifter 430 shifts the voltage held in the hold capacitor to a voltage higher by a predetermined voltage $V_{ADD}$, and outputs the addition result to the selector 440.

The selector 440 selects either the shift result from the level shifter 430 or the power supply voltage VDD in accordance with the control signal AZDp, and outputs the selected result to the comparator 300 as the control signal AZSW.

As illustrated in FIG. 6, the control signal AZSW is input to the gate of the auto-zero switch 313 in the comparator 300. In addition, the source of the auto-zero switch 313 (pMOS transistor) is connected to the drain of the input transistor 312. Therefore, the minimum gate-source voltage necessary for turning on the auto-zero switch 313 varies according to the voltage (that is, the input voltage $V_{VSL}$) of the source of the input transistor 312.

In view of this, the driver 400 samples and holds the average of the input voltage $V_{VSL}$ during auto-zeroing in which the pixel is reset, and adds a voltage for achieving the necessary minimum gate-source voltage to the held voltage as $V_{ADD}$. Then, the driver 400 outputs the addition result to the comparator 300 as the control signal AZSW during auto-zeroing. As a result, the driver 400 can control the gate-source voltage of the auto-zero switch 313 to the minimum value necessary for turning on the auto-zero switch 313. This control can suppress the reset feedthrough when the auto-zero switch 313 is switched from the on state to the off state to thereby reduce noise and improve the image quality of the image data.

Figure 28:
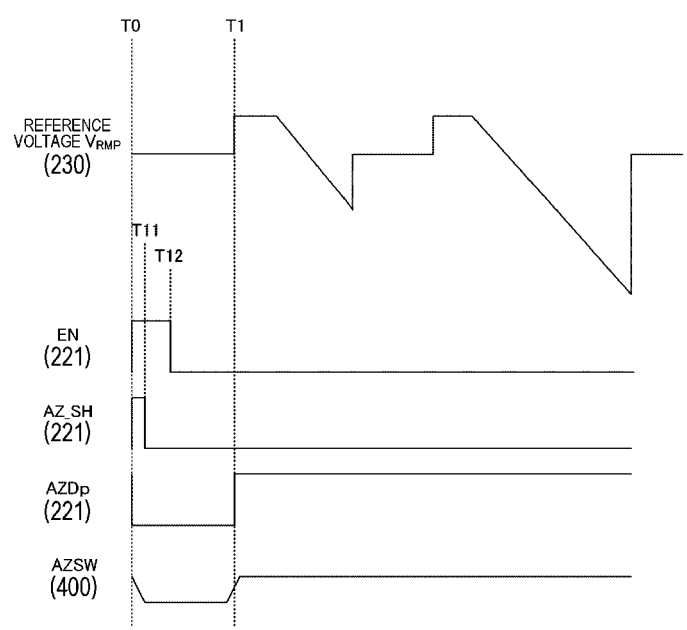
FIG. 28 is a timing chart illustrating an example of operation of a solid-state imaging element according to a second modification of the second embodiment of the present technology.

FIG. 28 is a timing chart illustrating an example of operation of the solid-state imaging element 200 according to the second embodiment of the present technology.

During a pulse period from a timing T0 to a timing T12 during an auto-zero period from the timing T0 to a timing T1, the control signal generator 221 supplies the enable signal EN of high level and closes the horizontal connection switch 241. After the timing T12, the enable signal EN is controlled to a low level.

In addition, in the pulse period from the timing T0 to a timing T11, the control signal generator 221 supplies the control signal AZ_SH of high level to close the sample switch 410, and holds the average of the input voltages $V_{VSL}$. After the timing T11, the control signal AZ_SH is controlled to the low level.

The control signal generator 221 supplies the control signal AZDp of low level during the auto-zero period from the timings T0 to T1, and causes the selector 440 to select the output of the level shifter 430. In addition, the driver 400 supplies the control signal AZSW of low level corresponding to the held voltage. After the timing T1, the control signal AZDp and the control signal AZSW are controlled to the high level.

Figure 29:
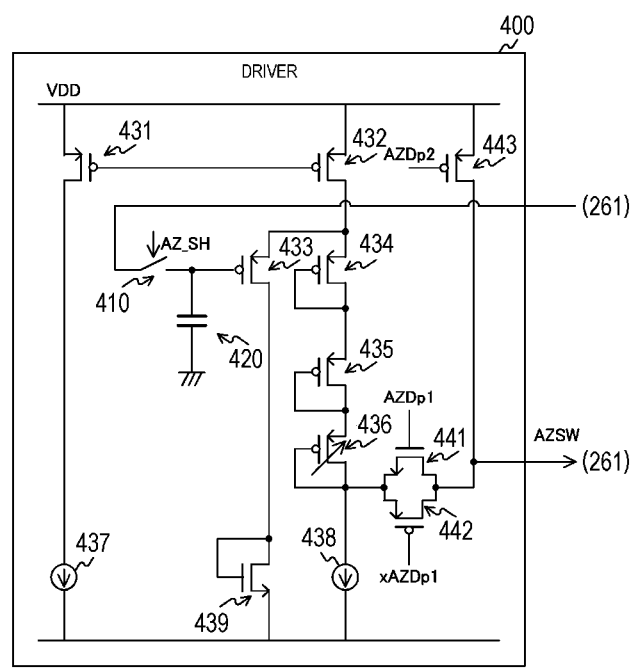
FIG. 29 is a circuit diagram illustrating a configuration example of a driver in the second embodiment of the present technology.

FIG. 29 is a circuit diagram illustrating a configuration example of the driver 400 in the second embodiment of the present technology. FIG. 29 illustrates a specific example of the driver 400 illustrated in FIG. 27. The driver 400 in FIG. 29 includes, for example, a sample switch 410, a hold capacitor 420, pMOS transistors 431 to 436, current sources 437 and 438, and an nMOS transistor 439. In addition, the driver 400 further includes an nMOS transistor 441 and pMOS transistors 442 and 443.

The pMOS transistors 431 and 432 are connected in parallel to the power supply voltage VDD. The current source 437 is inserted between a drain of the pMOS transistor 431 and a predetermined reference potential.

The sample switch 410 opens and closes a path between the horizontal connection switch 241 and one end of the hold capacitor 420 in accordance with the control signal AZ_SH. The other end of the hold capacitor 420 is grounded.

A gate of the pMOS transistor 433 is connected to one end of the hold capacitor 420, and a source is connected to a drain of the pMOS transistor 432. The nMOS transistor 439 is inserted between a drain of the pMOS transistor 433 and the reference potential, and a gate and a drain are short-circuited.

The pMOS transistors 434 to 436 and the current source 438 are connected in series between the drain of the pMOS transistor 432 and the reference potential. Furthermore, a gate and a drain of each of the pMOS transistors 434 to 436 are short-circuited. The size of the pMOS transistor 436 can be adjusted as necessary.

A source of the pMOS transistor 443 is connected to the power supply voltage VDD. A control signal AZDp2 from the control signal generator 221 is input to a gate of the pMOS transistor 443.

Furthermore, the nMOS transistor 441 and the pMOS transistor 442 are connected in parallel between a connection node of the pMOS transistor 436 and the current source 438 and the drain of the pMOS transistor 443. A control signal AZDp1 from the control signal generator 221 is input to a gate of the nMOS transistor 441. A signal xAZDp1 obtained by inverting the control signal AZDp1 is input to a gate of the pMOS transistor 442.

With the above-described connection configuration, a circuit including the pMOS transistors 431 to 436, the current sources 437 and 438, and the nMOS transistor 439 functions as the level shifter 430 in FIG. 27. In addition, a circuit including the nMOS transistor 441 and the pMOS transistors 442 and 443 functions as the selector 440 in FIG. 27.

Note that, although the driver 400 in FIG. 27 is implemented by the circuit illustrated in FIG. 29, the circuit in the driver 400 is not limited to that illustrated in FIG. 29 as long as the function described in FIG. 27 can be implemented.

Figure 30:
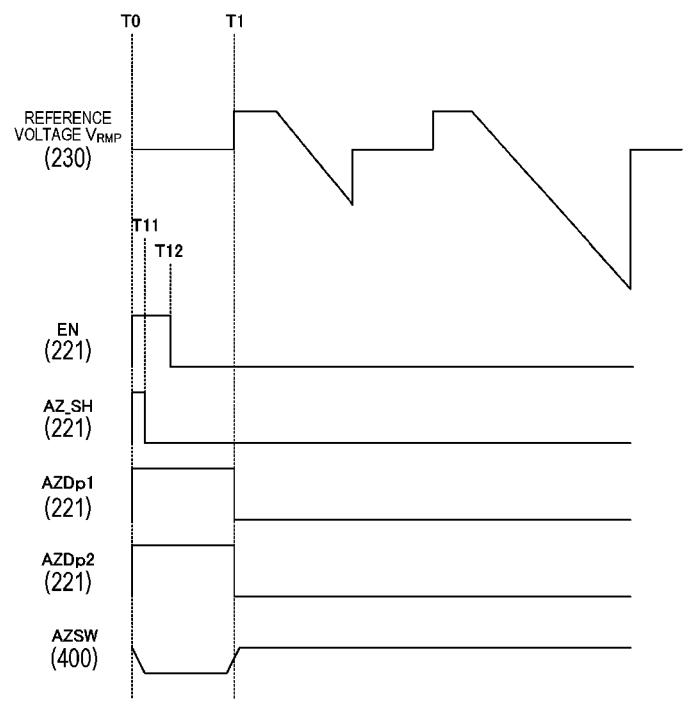
FIG. 30 is a timing chart illustrating an example of operation of the timing controller in the second embodiment of the present technology.

FIG. 30 is a timing chart illustrating an example of operation of the timing controller in the second embodiment of the present technology. The timing chart in FIG. 30 is for controlling the driver 400 illustrated in FIG. 29.

During a pulse period from the timing T0 to timing T12, the control signal generator 221 supplies the enable signal EN of high level. After the timing T12, the enable signal EN is controlled to a low level.

In addition, during a pulse period from the timing T0 to timing T11, the control signal generator 221 supplies the control signal AZ_SH of high level. After the timing T11, the control signal AZ_SH is controlled to the low level.

The control signal generator 221 sets the control signal AZDp1 to the high level during a period from the timings T0 to T1. After the timing T1, the control signal AZDp1 is controlled to the low level.

The control signal generator 221 supplies the control signal AZDp2 of high level during the auto-zero period from the timing T0 to the timing T1. In addition, the driver 400 supplies the control signal AZSW of low level corresponding to the held voltage. After the timing T1, the control signal AZDp2 is controlled to the low level and the control signal AZSW is controlled to the high level.

Note that the input voltages $V_{VSL}$ can be sampled for each row or for each frame. When the number of rows is M (M is an integer), the input voltages $V_{VSL}$ are sampled M times for each frame in a case where the input voltages $V_{VSL}$ are sampled for each row.

Note that each of the first to fourth modifications of the first embodiment can be applied to the second embodiment.

As described above, according to the second embodiment of the present technology, the driver 400 samples the input voltages $V_{VSL}$, holds the sampled voltage, and supplies the control signal AZSW corresponding to the held voltage, whereby the gate-source voltage of the auto-zero switch 313 can be controlled to a minimum value. This configuration can suppress the reset feedthrough to thereby reduce noise and improve the image quality of the image data.

[First Modification]

In the second embodiment described above, the driver 400 samples the pixel signals of the pixel circuit 250. In this case, the values to be sampled desirably have a black level. A solid-state imaging element 200 according to the first modification of the first embodiment is different from that of the second embodiment in sampling pixel signals of pixels shielded from light.

Figure 31:
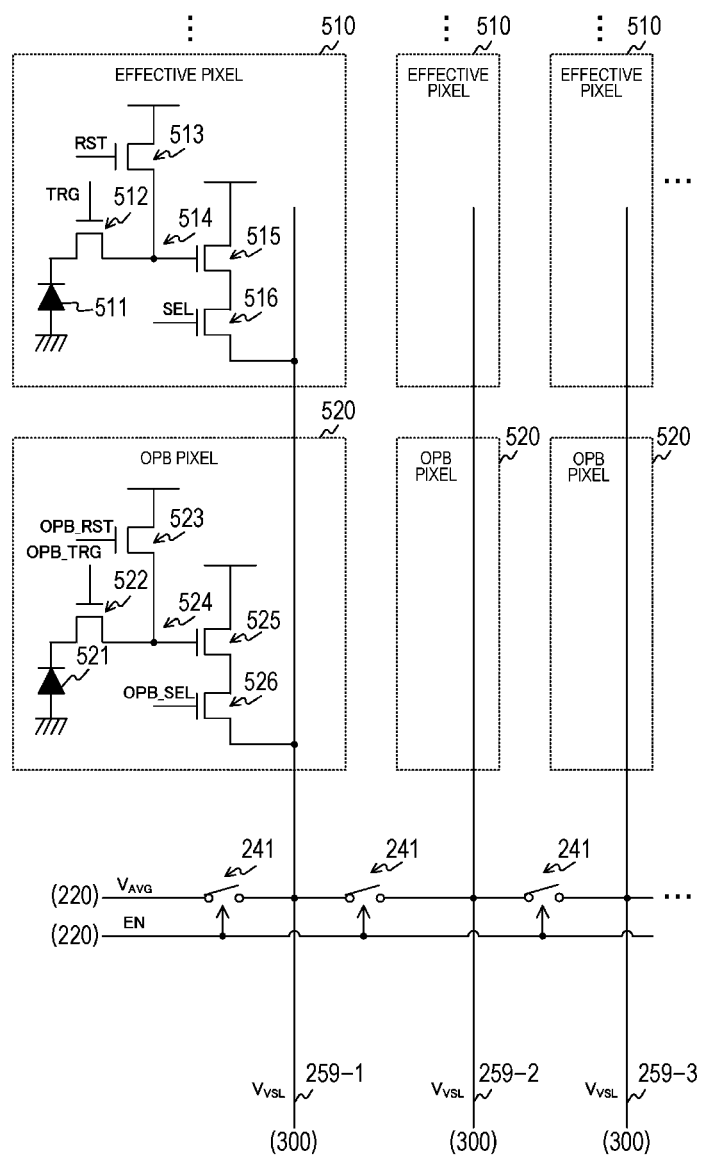
FIG. 31 is a circuit diagram illustrating a configuration example of a pixel array section in a first modification of the second embodiment of the present technology.

FIG. 31 is a circuit diagram illustrating a configuration example of a pixel array section 240 in the second modification of the second embodiment of the present technology. The pixel array section 240 in the second modification of the second embodiment is different from that of the second embodiment in that a plurality of effective pixels 510 and a plurality of optical black (OPB) pixels 520 are arrayed. For example, OPB pixels 520 of at least one row are arrayed.

The effective pixel 510 is a pixel that is not shielded from light, and includes a photoelectric conversion element 511, a transfer transistor 512, a reset transistor 513, a floating diffusion layer 514, an amplification transistor 515, and a selection transistor 516.

The OPB pixel 520 is a pixel that is shielded from light, and includes a photoelectric conversion element 521, a transfer transistor 522, a reset transistor 523, a floating diffusion layer 524, an amplification transistor 525, and a selection transistor 526. The OPB pixel 520 is supplied with a selection signal OPB_SEL and a reset signal OPB_RST.

The circuit configurations of the effective pixel 510 and the OPB pixel 520 are similar to the circuit configuration of the pixel circuit 250 illustrated in FIG. 4.

During the auto-zero period, the vertical scanning circuit 210 drives the OPB pixels 520 so that the OPB pixels 520 output pixel signals via the vertical signal lines 259. Since the OPB pixel 520 is shielded from light, the pixel signal to be read has a black level. The driver 400 samples and holds the average of the pixel signals of black level, and supplies a control signal AZSW of a voltage corresponding to the held voltage.

Figure 32:
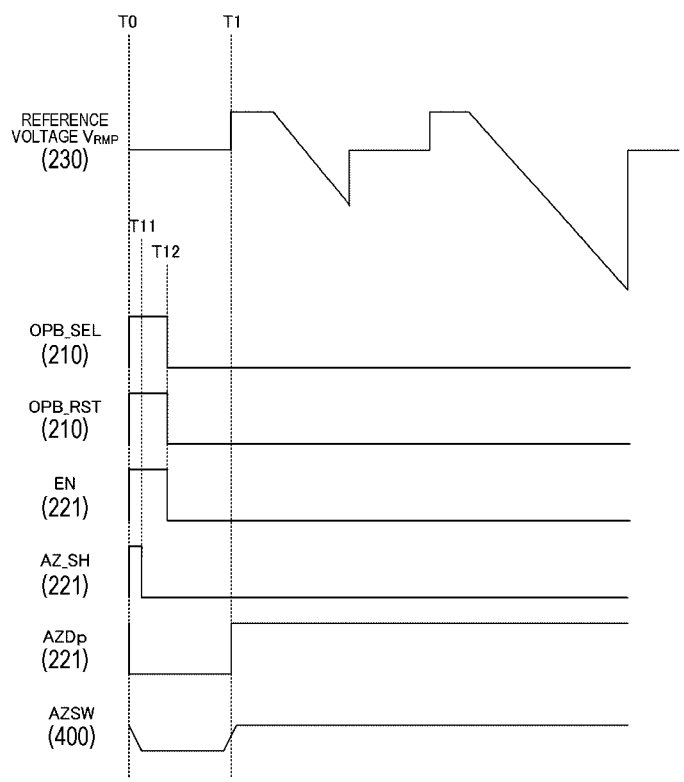
FIG. 32 is a timing chart illustrating an example of operation of a solid-state imaging element according to the first modification of the second embodiment of the present technology.

FIG. 32 is a timing chart illustrating an example of operation of the solid-state imaging element 200 according to the first modification of the second embodiment of the present technology.

The vertical scanning circuit 210 supplies the selection signal OPB_SEL and the reset signal OPB_RST to the OPB pixels 520 during a period from the timing T0 to the timing T12 to allow the OPB pixels 520 to output pixel signals of black level.

Waveforms of the enable signal EN, the control signal AZ_SH, the control signal AZDp, and the control signal AZSW of the first modification of the second embodiment are similar to those of the second embodiment. The driver 400 samples and holds the average of the pixel signals of black level, and supplies the control signal AZSW on the basis of the held voltage. Since the OPB pixel 520 is shielded from light, the black level does not vary due to incident light, and noise can be reliably suppressed by sampling and using this constant level.

Note that each of the first to fourth modifications of the first embodiment can be applied to the first modification of the second embodiment.

As described above, according to the first modification of the second embodiment of the present technology, the driver 400 samples and holds the pixel signals of black level of the OPB pixels 520 and generates the control signal AZSW on the basis of the held voltage, so that noise can be reliably suppressed.

[Second Modification]

In the second embodiment described above, the driver 400 samples the average of the pixel signals, but in this configuration, the horizontal connection switch 241 is required for each column. A solid-state imaging element 200 according to the second modification of the second embodiment is different from that of the second embodiment in that pixel signals of dummy pixels are sampled and the horizontal connection switch 241 is eliminated.

Figure 33:
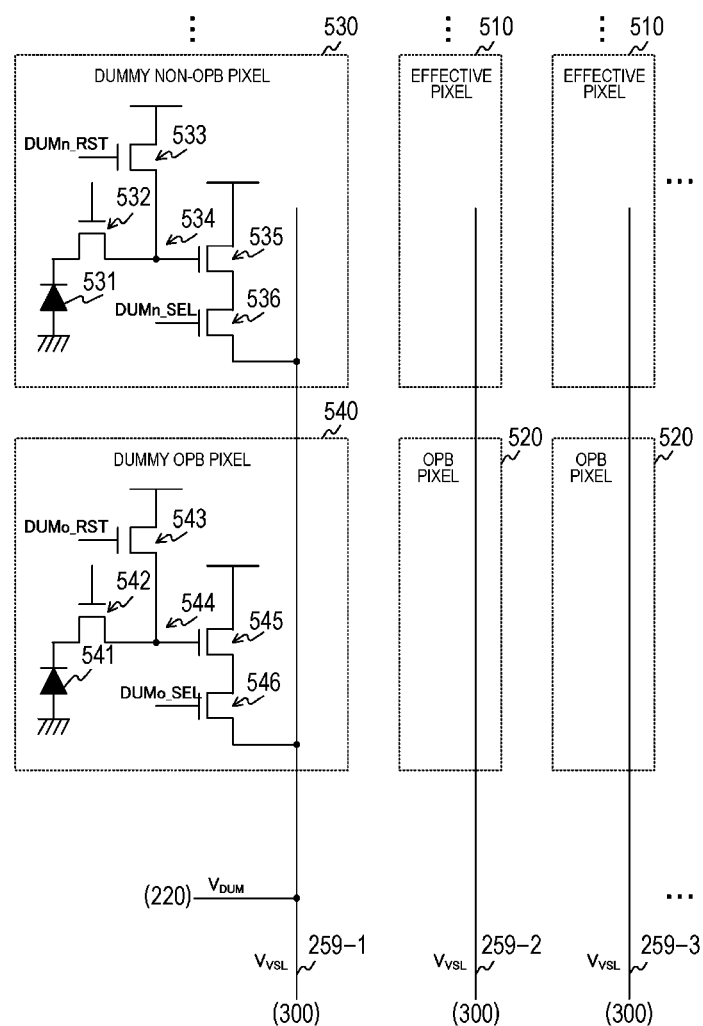
FIG. 33 is a circuit diagram illustrating a configuration example of a pixel array section in the second modification of the second embodiment of the present technology.

FIG. 33 is a circuit diagram illustrating a configuration example of a pixel array section 240 in the second modification of the second embodiment of the present technology. The pixel array section 240 in the third modification of the second embodiment is different from that of the second embodiment in that a plurality of effective pixels 510, a plurality of OPB pixels 520, a plurality of dummy non-OPB pixels 530, and a plurality of dummy OPB pixels 540 are arrayed. For example, OPB pixels 520 of at least one row are arrayed, and dummy non-OPB pixels 530 and dummy OPB pixels 540 of at least one column are arrayed.

Furthermore, the pixel array section 240 according to the second modification of the second embodiment is different from that of the second embodiment in that the horizontal connection switch 241 is not provided.

The dummy non-OPB pixel 530 and the dummy OPB pixel 540 are pixels for which AD conversion is not performed on a pixel signal (in other words, from which a pixel signal is not read). The ADC is not arranged in the dummy column. The vertical signal line 259 of the dummy column is connected to the timing controller 220. Further, the dummy non-OPB pixel 530 is not shielded from light, and the dummy OPB pixel 540 is shielded from light.

The dummy non-OPB pixel 530 includes a photoelectric conversion element 531, a transfer transistor 532, a reset transistor 533, a floating diffusion layer 534, an amplification transistor 535, and a selection transistor 536. The dummy non-OPB pixel 530 is supplied with a selection signal DUMn_SEL and a reset signal DUMn_RST.

The dummy OPB pixel 540 includes a photoelectric conversion element 541, a transfer transistor 542, a reset transistor 543, a floating diffusion layer 544, an amplification transistor 545, and a selection transistor 546. The dummy OPB pixel 540 is supplied with a selection signal DUMo_SEL and a reset signal DUMo_RST.

The circuit configurations of the dummy non-OPB pixel 530 and the dummy OPB pixel 540 are similar to the circuit configuration of the pixel circuit 250 illustrated in FIG. 4.

During the auto-zero period, the vertical scanning circuit 210 drives the dummy non-OPB pixels 530 so that the dummy non-OPB pixels 530 output pixel signals via the vertical signal line 259. The driver 400 samples the pixel signals, and supplies a control signal AZSW on the basis of the voltage thereof. As illustrated in FIG. 33, it is not necessary to obtain the average of the pixel signals of all columns by sampling the pixel signals of the dummy column, and thus, the horizontal connection switch 241 is not necessary.

Figure 34:
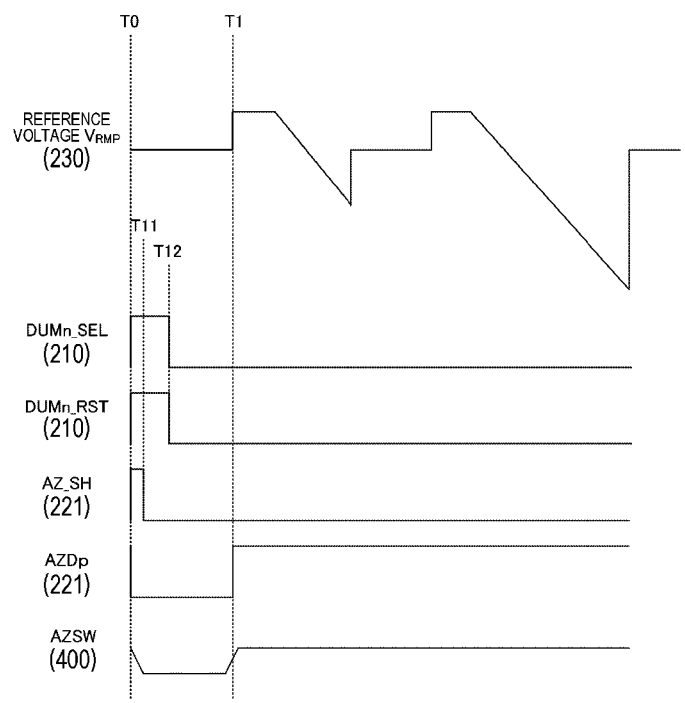
FIG. 34 is a timing chart illustrating an example of operation of the solid-state imaging element according to the second modification of the second embodiment of the present technology.

FIG. 34 is a timing chart illustrating an example of operation of the solid-state imaging element 200 according to the second modification of the second embodiment of the present technology.

The vertical scanning circuit 210 supplies the selection signal OPBn_SEL and the reset signal OPBn_RST to the dummy non-OPB pixels 530 during a period from the timing T0 to the timing T12 to allow the dummy non-OPB pixels 530 to output pixel signals.

Waveforms of the enable signal EN, the control signal AZ_SH, the control signal AZDp, and the control signal AZSW of the second modification of the second embodiment are similar to those of the second embodiment. The driver 400 samples the pixel signals of the dummy column, and supplies a control signal AZSW on the basis of the voltage thereof.

Figure 35:
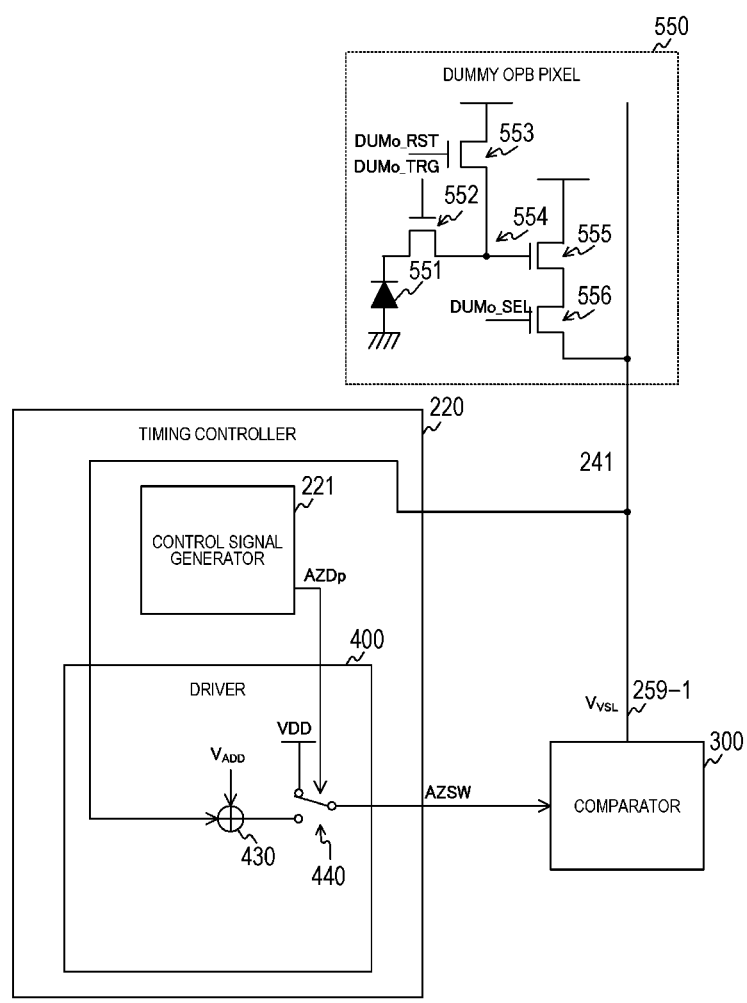
FIG. 35 is a circuit diagram illustrating a configuration example of a timing controller in the second modification of the second embodiment of the present technology.

FIG. 35 is a circuit diagram illustrating a configuration example of a timing controller 220 in the second modification of the second embodiment of the present technology. The timing controller 220 in the second modification of the second embodiment is different from that of the second embodiment in that the sample switch 410 and the hold capacitor 420 are not disposed in the driver 400.

The level shifter 430 in the driver 400 adds $V_{ADD}$ to the pixel signal of the dummy column and supplies the resultant signal to the selector 440.

Note that the driver 400 in the second modification of the second embodiment can be provided with the sample switch 410 and the hold capacitor 420.

In addition, each of the first to fourth modifications of the first embodiment can be applied to the second modification of the second embodiment.

As described above, according to the second modification of the second embodiment of the present technology, the driver 400 samples the pixel signals of the dummy column, so that it is not necessary to obtain the average of pixel signals of all columns. Thus, the horizontal connection switch 241 can be eliminated.

[Third Modification]

In the second modification of the second embodiment described above, the driver 400 samples the pixel signals of the dummy non-OPB pixels 530 not shielded from light, but the value to be sampled desirably has a black level. A solid-state imaging element 200 according to the third modification of the second embodiment is different from that of the second modification of the second embodiment in that the pixel signals of the dummy OPB pixels 540 shielded from light are sampled.

Figure 36:
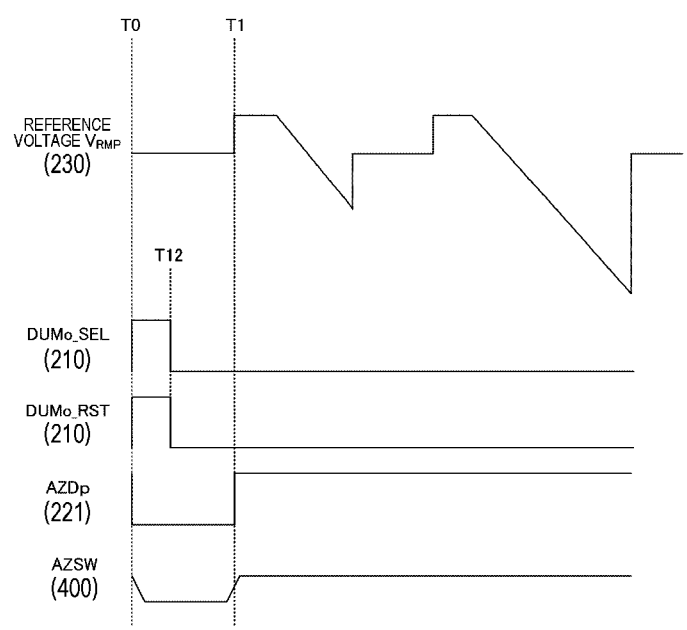
FIG. 36 is a timing chart illustrating an example of operation of a solid-state imaging element according to a third modification of the second embodiment of the present technology.

FIG. 36 is a timing chart illustrating an example of operation of the solid-state imaging element 200 according to the third modification of the second embodiment of the present technology.

The vertical scanning circuit 210 supplies a selection signal OPBo_SEL and a reset signal OPBo_RST to the dummy OPB pixels 540 during a period from the timing T0 to the timing T12 to allow the dummy OPB pixels 540 to output pixel signals of black level.

Waveforms of the enable signal EN, the control signal AZ_SH, the control signal AZDp, and the control signal AZSW of the fourth modification of the second embodiment are similar to those of the second embodiment. The driver 400 samples the pixel signals of black level of the dummy OPB pixels 540, and supplies a control signal AZSW on the basis of the voltage thereof.

Note that each of the first to fourth modifications of the first embodiment can be applied to the third modification of the second embodiment.

As described above, according to the third modification of the second embodiment of the present technology, the driver 400 samples the pixel signals of black level of the dummy OPB pixels 540 and generates the control signal AZSW on the basis of the voltage thereof, so that noise can be reliably suppressed.

[Fourth Modification]

In the second embodiment described above, the comparator 300 in which the vertical signal line 259 is directly connected to the source of the input transistor 312 is used for the ADC, but the comparator 300 having another configuration can also be used. A solid-state imaging element 200 according to a fourth modification of the second embodiment is different from that of the second embodiment in that a comparator 300 in which an nMOS transistor is connected to the source of the input transistor 312 is used.

Figure 37:
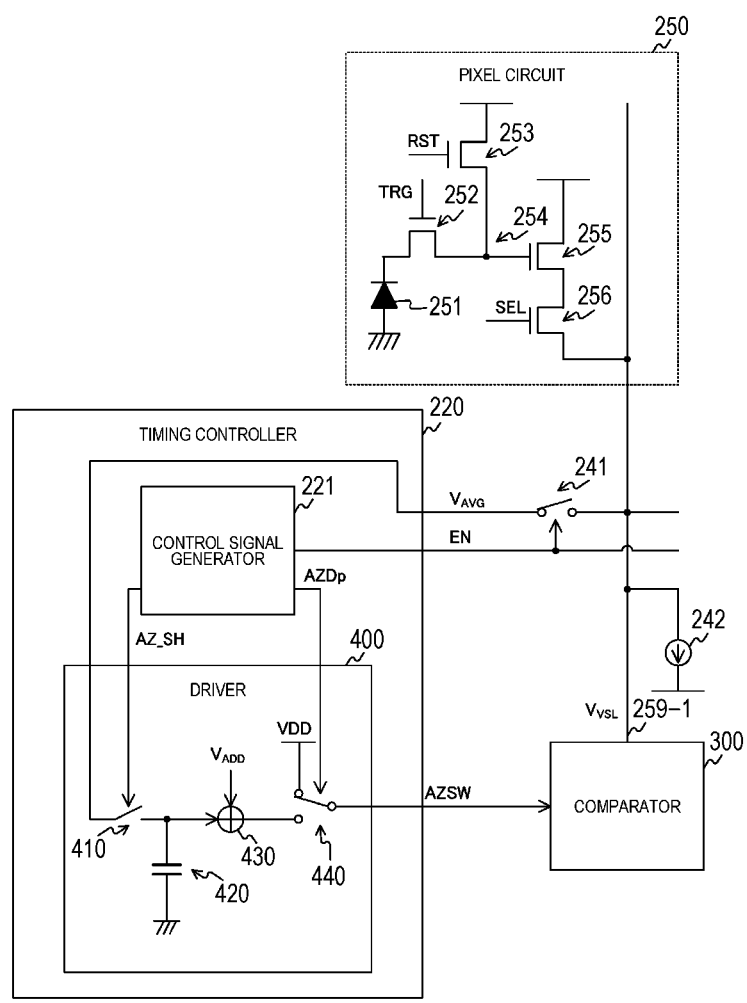
FIG. 37 is a circuit diagram illustrating a configuration example of a pixel array section and a timing controller in a fourth modification of the second embodiment of the present technology.

FIG. 37 is a circuit diagram illustrating a configuration example of a pixel array section 240 and a timing controller 220 in the fourth modification of the second embodiment of the present technology. The solid-state imaging element 200 according to the fourth modification of the second embodiment is different from that of the second embodiment in that a load current source 242 is connected to each vertical signal line 259.

The operation of the driver 400 in the fourth modification of the second embodiment is similar to that of the second embodiment.

Figure 38:
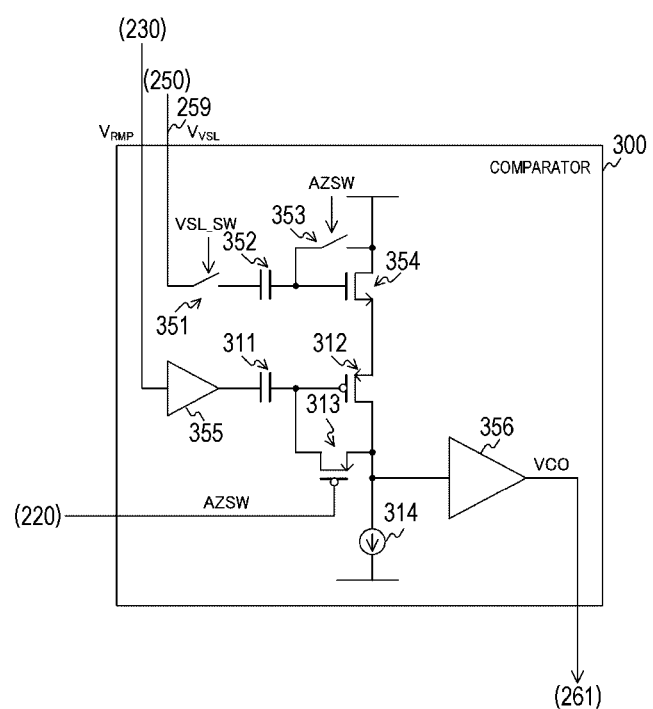
FIG. 38 is a circuit diagram illustrating a configuration example of a comparator in the fourth modification of the second embodiment of the present technology.

FIG. 38 is a circuit diagram illustrating a configuration example of the comparator 300 in the fourth modification of the second embodiment of the present technology. The comparator 300 according to the fourth modification of the second embodiment includes a VSL switch 351, an input capacitor 352, an auto-zero switch 353, and an nMOS transistor 354. In addition, the comparator 300 further includes an input amplifier 355, an input capacitor 311, an input transistor 312, an auto-zero switch 313, a current source 314, and an output amplifier 356.

The VSL switch 351 opens and closes a path between the vertical signal line 259 and one end of the input capacitor 352 in accordance with a control signal VSL_SW from the timing controller 220. The other end of the input capacitor 352 is connected to a gate of the nMOS transistor 354.

The auto-zero switch 353 short-circuits the gate and the drain of the nMOS transistor 354 in accordance with a control signal AZSW. The nMOS transistor 354 is inserted between the power supply voltage and the source of the input transistor 312 (pMOS transistor). Note that the nMOS transistor 354 is an example of a second comparison element set forth in the claims.

The input amplifier 355 amplifies the reference signal and supplies the amplified reference signal to one end of the input capacitor 311. The connection configuration of the input capacitor 311, the input transistor 312, the auto-zero switch 313, and the current source 314 is similar to that of the first embodiment.

The output amplifier 356 amplifies the voltage of the connection node between the input transistor 312 and the current source 314 and outputs the amplified voltage as an output signal vco.

As illustrated in FIG. 38, due to the connection between the source of the input transistor 312 and the vertical signal line 259 via the nMOS transistor 354, the voltage of the source can be reduced as compared with a case where the source is directly connected to the vertical signal line 259. The voltage of the reference signal can be decreased according to the decrease in the source voltage.

Note that each of the first, second, and third modifications of the second embodiment can be applied to the fourth modification of the second embodiment.

As described above, according to the fourth modification of the second embodiment of the present technology, the source of the input transistor 312 is connected to the vertical signal line 259 via the nMOS transistor 354, whereby the voltage of the source can be reduced. As a result, the voltage of the reference signal can be reduced.

[Fifth Modification]

In the second embodiment described above, the driver 400 drives the auto-zero switch 313 in the comparator 300, but the auto-zero switch 313 in a column amplifier can be driven instead. A solid-state imaging element 200 according to a fifth modification of the second embodiment is different from that of the second embodiment in that a driver 400 drives an auto-zero switch 313 in a column amplifier.

Figure 39:
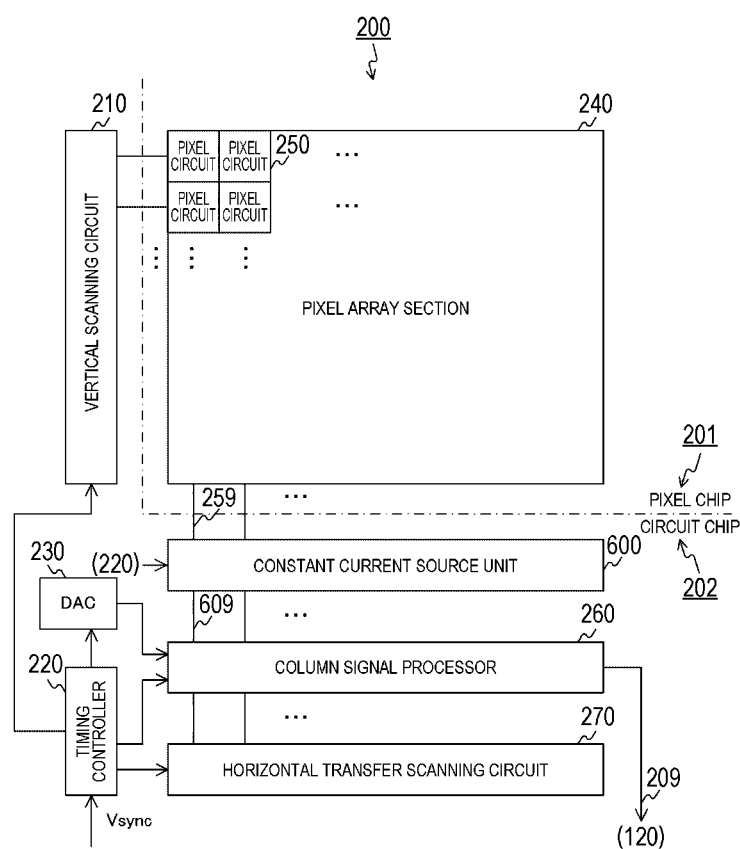
FIG. 39 is a block diagram illustrating a configuration example of a solid-state imaging element according to a fifth modification of the second embodiment of the present technology.

FIG. 39 is a block diagram illustrating a configuration example of the solid-state imaging element 200 according to the fifth modification of the second embodiment of the present technology. The solid-state imaging element 200 according to the fifth modification of the second embodiment is different from that of the second embodiment in that a constant current source unit 600 is disposed between the pixel array section 240 and the column signal processor 260. The constant current source unit 600 is provided, for example, in the circuit chip 202.

Figure 40:
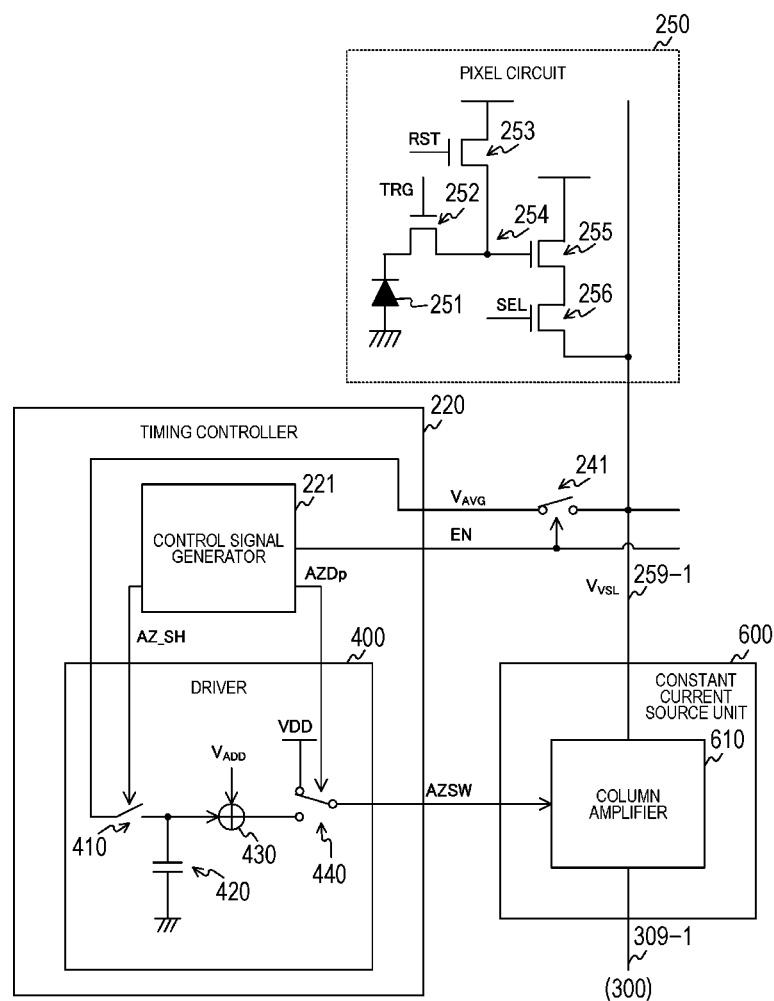
FIG. 40 is a circuit diagram illustrating a configuration example of a pixel array section, a constant current source, and a timing controller in the fifth modification of the second embodiment of the present technology.

FIG. 40 is a circuit diagram illustrating a configuration example of the pixel array section 240, the constant current source unit 600, and the timing controller 220 in the fifth modification of the second embodiment of the present technology.

The constant current source unit 600 is provided with a column amplifier 610 for each column. The column amplifier 610 amplifies the voltage of the vertical signal line 259 and supplies the amplified voltage to the comparator 300 in the ADC. In addition, the timing controller 220 in the sixth modification of the second embodiment supplies a control signal AZSW to the column amplifier 610. The operation of the driver 400 in the timing controller 220 in the fifth modification of the second embodiment is similar to that of the second embodiment. As a result, reset feedthrough in the column amplifier 610 can be suppressed.

Figure 41:
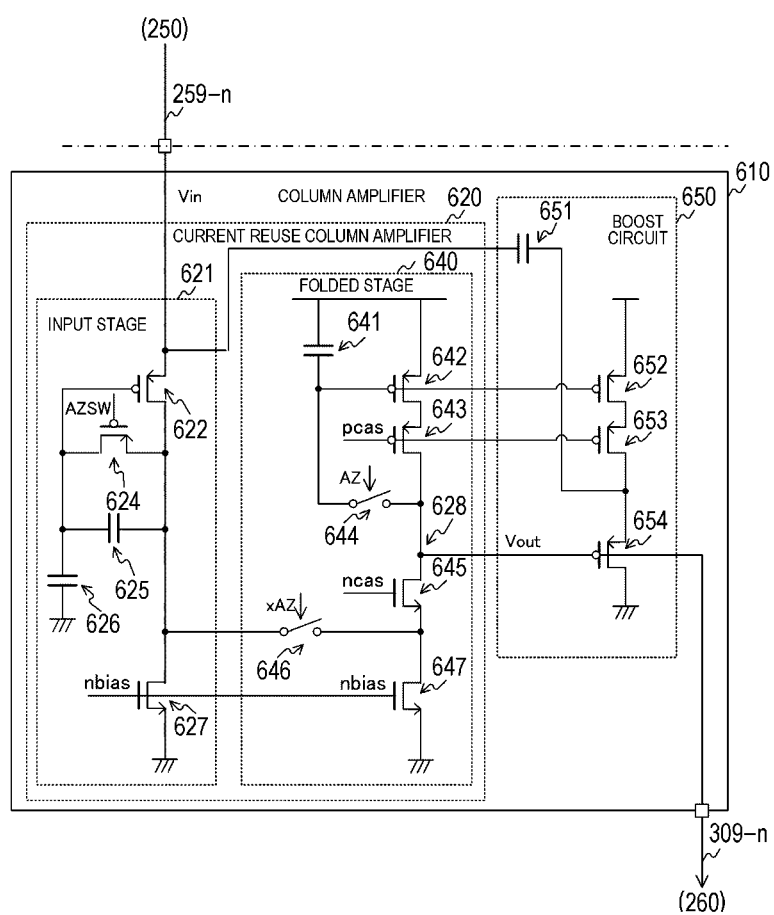
FIG. 41 is a circuit diagram illustrating a configuration example of a column amplifier in the fifth modification of the second embodiment of the present technology.

FIG. 41 is a circuit diagram illustrating a configuration example of the column amplifier 610 in the fifth modification of the second embodiment of the present technology. The column amplifier 610 includes a current reuse column amplifier 620 and a boost circuit 650. The current reuse column amplifier 620 includes an input stage 621 and a folded stage 640.

The input stage 621 includes an input transistor 622, an input-side auto-zero switch 624, a feedback capacitor 625, a reference-side capacitor 626, and a reference-side current source transistor 627. Further, a pMOS transistor is used as the input transistor 622, for example. An nMOS transistor is used as the reference-side current source transistor 627, for example.

A source of the input transistor 622 is connected to the vertical signal line 259-$n$, and a drain is connected to a drain of the reference-side current source transistor 627. The input-side auto-zero switch 624 opens and closes a path between the gate and the drain of the input transistor 622 in accordance with an auto-zero signal AZ.

The feedback capacitor 625 is inserted between the drain of the input transistor 622 and the gate of the input transistor 622. Further, the reference-side capacitor 626 is inserted between the gate of the input transistor 622 and the reference voltage.

In addition, the source of the reference-side current source transistor 627 is connected to a predetermined reference voltage. A predetermined bias voltage nbias is applied to the gate of the reference-side current source transistor 627.

With the above-described configuration, the gate-source voltage of the input transistor 622 fluctuates according to the input voltage $V_{VSL}$ input to the source of the input transistor 622, and the drain current of the input transistor 622 changes. Vout corresponding to the drain current is output from the drain of the input transistor 622. In this manner, the voltage corresponding to the gate-source voltage of the input transistor 622 is output from the drain thereof. In addition, a part of a constant bias current supplied from the reference-side current source transistor 627 is fed back to the gate of the input transistor 622 by a feedback circuit including the input-side auto-zero switch 624, the feedback capacitor 625, and the reference-side capacitor 626. Due to the feedback circuit, power consumption can be reduced.

The folded stage 640 includes a cascode capacitor 641, a power-supply-side current source transistor 642, cascode transistors 643 and 645, an auto-zero switch 644, an intermediate switch 646, and a reference-side current source transistor 647.

As the power-supply-side current source transistor 642 and the cascode transistor 643, pMOS transistors are used, and as the cascode transistor 645 and the reference-side current source transistor 647, nMOS transistors are used.

The cascode capacitor 641 is inserted between a power node of a predetermined power supply voltage and the output-side auto-zero switch 644.

The power-supply-side current source transistor 642, the cascode transistor 643, the cascode transistor 645, and the reference-side current source transistor 647 are connected in series to a power supply voltage. In addition, a gate of the power-supply-side current source transistor 642 is connected to a node between the cascode capacitor 641 and the output-side auto-zero switch 644. A bias voltage pcas is applied to a gate of the cascode transistor 643. A predetermined bias voltage ncas is applied to a gate of the cascode transistor 645. A bias voltage nbias that is the same as that of the reference-side current source transistor 627 is applied to a gate of the reference-side current source transistor 647.

The output-side auto-zero switch 644 opens and closes a path between the cascode capacitor 641 and an output node 628 in accordance with the auto-zero signal AZ. The intermediate switch 646 opens and closes a path between a node between the input transistor 622 and the reference-side current source transistor 627 and a node between the cascode transistor 645 and the reference-side current source transistor 647 in accordance with an inversion signal xAZ.

The addition of the folded stage 640 can increase the output range. In addition, the input stage 621 and the folded stage 640 can be separated by the intermediate switch 646 during auto-zeroing, and auto-zeroing can be performed separately.

The boost circuit 650 is provided with a boost-side capacitor 651, a boost-side current source transistor 652, a cascode transistor 653, and a boost transistor 654. As the boost-side current source transistor 652, the cascode transistor 653, and the boost transistor 654, pMOS transistors are used.

The boost-side current source transistor 652, the cascode transistor 653, and the boost transistor 654 are inserted in series between the power supply voltage and the reference potential. A predetermined bias voltage pbias is applied to a gate of the boost-side current source transistor 652, and a predetermined bias voltage pcas is applied to a gate of the cascode transistor 653. A gate of the boost transistor 654 is connected to the output node 628.

Further, the boost-side capacitor 651 is inserted between the vertical signal line 259-$n$ and a node between the cascode transistor 653 and the boost transistor 654.

The comparison result Vout can be buffered by the boost circuit 650 using the source follower of the boost transistor 654 and coupled to the vertical signal line 259-$n$ by the capacitor. As a result, a current for charging the boost-side capacitor 651 is extracted from the vertical signal line 259-$n$, and settling can be facilitated.

Note that the folded stage 640 and the boost circuit 650 are provided as necessary.

In addition, each of the first to fourth modifications of the first embodiment can be applied to the fifth modification of the second embodiment. In addition, each of the first to third modifications of the second embodiment can be applied to the fifth modification of the second embodiment.

As described above, according to the fifth modification of the second embodiment of the present technology, the driver 400 supplies the control signal AZSW to the column amplifier 610, whereby reset feedthrough in the column amplifier 610 can be suppressed.

3. Example of Application to Mobile Object

The technology according to the present disclosure (present technology) can be applied to various products. For example, the technology according to the present disclosure may be implemented as a device to be mounted on any type of mobile bodies such as vehicles, electric vehicles, hybrid electric vehicles, motorcycles, bicycles, personal mobilities, airplanes, drones, ships, and robots.

Figure 42:
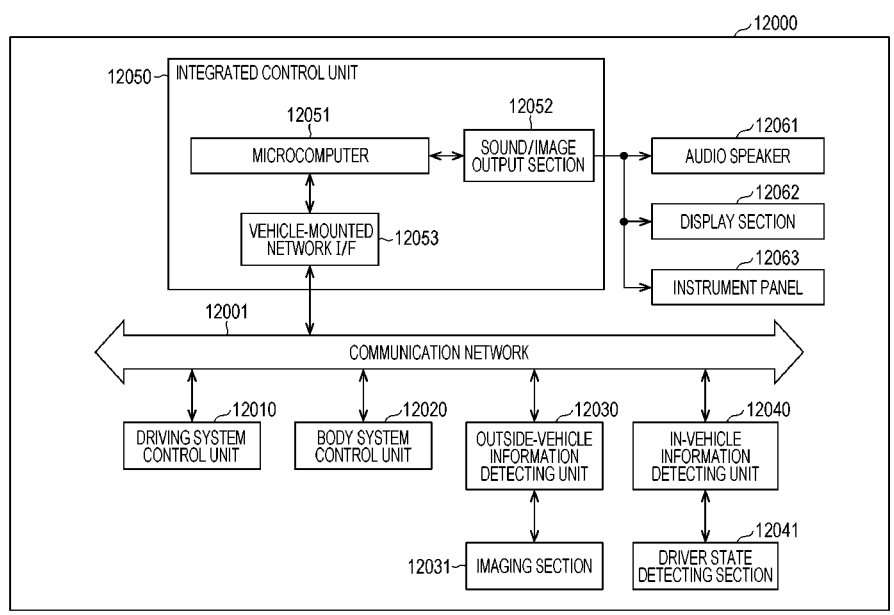
FIG. 42 is a block diagram illustrating an example of schematic configuration of a vehicle control system.

FIG. 42 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 42, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 42, an audio speaker 12061, a display section 12062, and an instrument panel 12063 are illustrated as the output device. The display section 12062 may, for example, include at least one of an on-board display and a head-up display.

Figure 43:
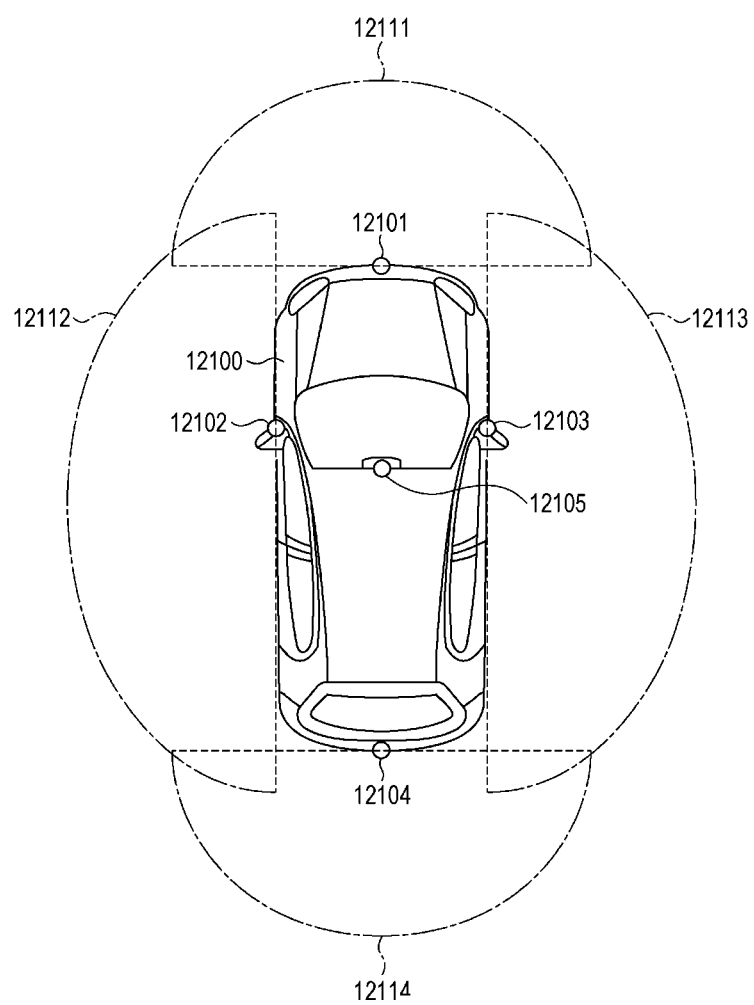
FIG. 43 is a diagram illustrating an example of installation position of an imaging section.

FIG. 43 is a diagram depicting an example of the installation position of the imaging section 12031.

In FIG. 43, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 45 depicts an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to, for example, the imaging section 12031 and the like in the configuration described above. Specifically, the imaging apparatus 100 in FIG. 1 can be applied to the imaging section 12031. By applying the technology according to the present disclosure to the imaging section 12031, the dynamic range can be widened and noise reduced, whereby an easier-to-see captured image can be obtained. Thus, driver's fatigue can be reduced.

Note that the above-described embodiments illustrate an example for embodying the present technology, and the matters in the embodiments and the invention-specifying matters in the claims have a correspondence relationship. Similarly, the invention-specifying matters in the claims and the matters in the embodiments of the present technology denoted by the same names as the invention-specifying matters have a correspondence relationship. However, the present technology is not limited to the embodiments, and can be embodied by making various modifications to the embodiments without departing from the gist thereof.

In addition, the effects described in the present specification are merely illustrative and not restrictive, and further, may have additional effects.

It is to be noted that the present technology may also have the following configurations.

(1)
A solid-state imaging element including:
a first comparison element that has a source to which an input voltage related to a voltage of a vertical signal line is input, the first comparison element outputting a drain voltage corresponding to a gate-source voltage from a drain; and
a transistor that has a gate to which a signal corresponding to the voltage of the vertical signal line is input, and a source connected to the drain of the first comparison element.

(2)
The solid-state imaging element according to (1), in which
the source of the first comparison element is connected to the vertical signal line,
the first comparison element has a gate to which a predetermined reference voltage is input,
the first comparison element transitions from an off state to an on state in a case where the input voltage and the reference voltage substantially coincide with each other, and
the transistor includes a first clamp transistor that fixes the drain voltage in the off state to a clamp voltage corresponding to the input voltage.

(3)
The solid-state imaging element according to (2), further including a clamp voltage controller that supplies the signal to a gate of the first clamp transistor, in which
the first clamp transistor is inserted between the drain and the source of the first comparison element.

(4)
The solid-state imaging element according to (3), further including a second clamp transistor connected in parallel to the first clamp transistor, in which
the second clamp transistor has a gate to which a fixed voltage is applied.

(5)
The solid-state imaging element according to (4), in which
the clamp voltage controller includes a capacitor inserted between the vertical signal line and the gate of the first clamp transistor.

(6)
The solid-state imaging element according to claim 4), in which
the clamp voltage controller divides a voltage between the voltage of the vertical signal line and a predetermined reference potential and supplies the divided voltage to the gate of the first clamp transistor.

(7)
The solid-state imaging element according to (6), further including an initialization circuit that samples a voltage of the vertical signal line, holds the sampled voltage as a held voltage, and initializes a gate voltage of the first clamp transistor on the basis of the held voltage.

(8)
The solid-state imaging element according to (7), in which
the initialization circuit samples and holds a pixel signal of a pixel circuit.

(9)
The solid-state imaging element according to (7), in which
the initial circuit samples and holds a pixel signal of a light-shielded pixel that is shielded from light.

(10)
The solid-state imaging element according to (7), in which
the initial circuit samples and holds a pixel signal of a dummy pixel.

(11)
The solid-state imaging element according to (7), in which
the driver samples and holds a pixel signal of a dummy pixel that is shielded from light.

(12)
The solid-state imaging element according to any one of (6) to (11), further including a counter that counts a count value during a period until the drain voltage is inverted.

(13)
The solid-state imaging element according to (12), further including:
a correction coefficient calculation unit that calculates a correction coefficient for correcting a conversion gain that is a ratio between the input voltage and the count value; and
a correction unit that corrects a digital signal indicating the count value on the basis of the correction coefficient.

(14)
The solid-state imaging element according to (12), further including:
a controller that calculates a correction coefficient for correcting a conversion gain that is a ratio between the input voltage and the count value, and controls the reference voltage on the basis of the correction coefficient.

(15)
The solid-state imaging element according to any one of (1) to (14), in which
the transistor includes an auto-zero switch that generates a short circuit between a gate and the drain of the first comparison element in accordance with the signal.

(16)
The solid-state imaging element according to (15), in which
the source of the first comparison element is connected to the vertical signal line, and
a predetermined reference voltage is input to the gate of the first comparison element.

(17)
The solid-state imaging element according to (15) or (16), further including a driver that generates a predetermined control signal as the signal on the basis of the voltage of the vertical signal line.

(18)
The solid-state imaging element according to (17), in which
the driver supplies one of two values as the control signal.

(19)
The solid-state imaging element according to (17) or (18), in which
the driver samples and holds a pixel signal of a pixel circuit, and generates the control signal on the basis of the held pixel signal.

(20)
The solid-state imaging element according to any one of (17) to (19), in which
the driver samples and holds a pixel signal of a light-shielded pixel shielded from light, and generates the control signal on the basis of the held pixel signal.

(21)
The solid-state imaging element according to any one of (17) to (19), in which
the driver generates the control signal on the basis of a pixel signal of a dummy pixel.

(22)
The solid-state imaging element according to (21), in which
the driver generates the control signal on the basis of a pixel signal of a dummy pixel that is shielded from light.

(23)
The solid-state imaging element according to any one of (17) to (22), in which
the first comparison element is disposed in a column amplifier that amplifies the voltage of the vertical signal line and supplies the amplified voltage to an analog-to-digital converter.

(24)
The solid-state imaging element according to any one of (17) to (22), further including
a second comparison element that has a gate to which the voltage of the vertical signal line is input, a drain connected to a power supply voltage, and a source connected to the source of the first comparison element.

REFERENCE SIGNS LIST

100 Imaging apparatus
110 Optical unit
120 DSP circuit
130 Display section
140 Operation section
150 Bus
160 Frame memory
170 Storage
180 Power supply
200 Solid-state imaging element
201 Light receiving chip
202 Circuit chip
210 Vertical scanning circuit
220 Timing controller
221 Control signal generator
230 DAC
231 Variable current source
232 Current converter
233, 285, 287, 314, 320, 437, 438 Current source
234 Switch
235, 333, 334 Resistor
240 Pixel array section
241 Horizontal connection switch
242 Load current source
250 Pixel circuit
251, 511, 521, 531, 541 Photoelectric conversion element
252, 512, 522, 532, 542 Transfer transistor
253, 513, 523, 533, 543 Reset transistor
254, 514, 524, 534, 544 Floating diffusion layer
255, 515, 525, 535, 545 Amplification transistor
256, 516, 526, 536, 546 Selection transistor
260 Column signal processor
261 Counter
262 Latch
270 Horizontal scanning circuit
280 Initialization circuit
281, 282, 410 Sample switch
283, 289, 420 Hold capacitor
284 Variable resistor
286 Replica circuit
288, 291, 354, 439, 441 nMOS transistor
290 Test voltage supply unit
295 Current controller
300 Comparator 311, 352 Input capacitor
312, 622 Input transistor
313, 353, 644 Auto-zero switch
315 Band-limiting capacitor
316, 317 Clamp transistor
318 Output transistor
319, 335 Initialization switch
330 Clamp voltage controller
331, 332 Capacitor
336 Capacitor connection switch
340 Image processor
341 Correction coefficient calculation unit
342, 440 Selector
343 Storage
344 Correction unit
351 VSL switch
355 Input amplifier
356 Output amplifier
400 Driver
430 Level shifter
431 to 436, 442, 443 pMOS transistor
510 Effective pixel
520 OPB pixel
530 Dummy non-OPB pixel
540 Dummy OPB pixel
600 Constant current source unit
610 Column amplifier
620 Power supply reuse column amplifier
621 Input stage
624 Input-side auto-zero switch
625 Feedback capacitor
626 Reference-side capacitor
627, 647 Power-supply-side current source transistor
640 Folded stage
641 Cascode capacitor
642 Power-supply-side current source transistor
643, 645, 653 Cascode transistor
644 Output-side auto-zero switch
646 Intermediate switch
650 Boost circuit
651 Boost capacitor
652 Boost-side current source transistor
654 Boost transistor
12031 Imaging section

The invention claimed is:

1. A solid-state imaging element, comprising:
a first comparison element that has a source to which an input voltage related to a voltage of a vertical signal line is input, the first comparison element outputting a drain voltage corresponding to a gate-source voltage from a drain; and
a transistor that has a gate to which a signal corresponding to the voltage of the vertical signal line is input, and a source connected to the drain of the first comparison element.

2. The solid-state imaging element according to claim 1, wherein
the source of the first comparison element is connected to the vertical signal line,
the first comparison element has a gate to which a predetermined reference voltage is input,
the first comparison element transitions from an off state to an on state in a case where the input voltage and the predetermined reference voltage substantially coincide with each other, and
the transistor includes a first clamp transistor that fixes the drain voltage in the off state to a clamp voltage corresponding to the input voltage.

3. The solid-state imaging element according to claim 2, further comprising a clamp voltage controller that supplies the signal to a gate of the first clamp transistor, wherein
the first clamp transistor is inserted between the drain and the source of the first comparison element.

4. The solid-state imaging element according to claim 3, further comprising a second clamp transistor connected in parallel to the first clamp transistor, wherein
the second clamp transistor has a gate to which a fixed voltage is applied.

5. The solid-state imaging element according to claim 3, wherein
the clamp voltage controller includes a capacitor inserted between the vertical signal line and the gate of the first clamp transistor.

6. The solid-state imaging element according to claim 3, wherein
the clamp voltage controller divides a voltage between the voltage of the vertical signal line and a predetermined reference potential and supplies the divided voltage to the gate of the first clamp transistor.

7. The solid-state imaging element according to claim 6, further comprising an initialization circuit that samples the voltage of the vertical signal line, holds the sampled voltage as a held voltage, and initializes a gate voltage of the first clamp transistor on a basis of the held voltage.

8. The solid-state imaging element according to claim 7, wherein
the initialization circuit samples and holds a pixel signal of a pixel circuit.

9. The solid-state imaging element according to claim 7, wherein
the initialization circuit samples and holds a pixel signal of a light-shielded pixel that is shielded from light.

10. The solid-state imaging element according to claim 7, wherein
the initialization circuit samples and holds a pixel signal of a dummy pixel.

11. The solid-state imaging element according to claim 7, wherein
a driver samples and holds a pixel signal of a dummy pixel that is shielded from light.

12. The solid-state imaging element according to claim 6, further comprising a counter that counts a count value during a period until the drain voltage is inverted.

13. The solid-state imaging element according to claim 12, further comprising:
a correction coefficient calculation unit that calculates a correction coefficient for correcting a conversion gain that is a ratio between the input voltage and the count value; and
a correction unit that corrects a digital signal indicating the count value on a basis of the correction coefficient.

14. The solid-state imaging element according to claim 12, further comprising:
a controller that calculates a correction coefficient for correcting a conversion gain that is a ratio between the input voltage and the count value, and controls the predetermined reference voltage on a basis of the correction coefficient.

15. The solid-state imaging element according to claim 1, wherein the transistor includes an auto-zero switch that short-circuits a gate and the drain of the first comparison element in accordance with the signal.

16. The solid-state imaging element according to claim 15, wherein the source of the first comparison element is connected to the vertical signal line, and a predetermined reference voltage is input to the gate of the first comparison element.

17. The solid-state imaging element according to claim 15, further comprising a driver that generates a predetermined control signal as the signal on a basis of the voltage of the vertical signal line.

18. The solid-state imaging element according to claim 17, wherein the driver supplies one of two values as the predetermined control signal.

19. The solid-state imaging element according to claim 17, wherein the driver samples and holds a pixel signal of a pixel circuit, and generates the predetermined control signal on a basis of the held pixel signal.

20. The solid-state imaging element according to claim 17, wherein the driver samples and holds a pixel signal of a light-shielded pixel shielded from light, and generates the predetermined control signal on a basis of the held pixel signal.

21. The solid-state imaging element according to claim 17, wherein the driver generates the predetermined control signal on a basis of a pixel signal of a dummy pixel.

22. The solid-state imaging element according to claim 21, wherein the driver generates the predetermined control signal on a basis of the pixel signal of the dummy pixel that is shielded from light.

23. The solid-state imaging element according to claim 17, wherein the first comparison element is disposed in a column amplifier that amplifies the voltage of the vertical signal line and supplies the amplified voltage to an analog-to-digital converter.

24. The solid-state imaging element according to claim 17, further comprising a second comparison element that has a gate to which the voltage of the vertical signal line is input, a drain connected to a power supply voltage, and a source connected to the source of the first comparison element.

* * * * *